United States Patent [19]
Inoue

[11] Patent Number: 4,572,637
[45] Date of Patent: Feb. 25, 1986

[54] FILM END DETECTOR FOR USE IN CAMERAS

[75] Inventor: Akira Inoue, Hachioji, Japan

[73] Assignee: Olympus Optical, Co., Ltd., Tokyo, Japan

[21] Appl. No.: 569,149

[22] Filed: Jan. 9, 1984

[30] Foreign Application Priority Data

Feb. 28, 1983 [JP] Japan .................................. 58-32036
Feb. 28, 1983 [JP] Japan .................................. 58-32037

[51] Int. Cl.⁴ ......................... G03B 1/24; G03B 17/42
[52] U.S. Cl. ................................ 354/173.11; 354/214
[58] Field of Search ............ 354/145.1, 173.11, 173.1, 354/204, 213, 214, 412, 418

[56] References Cited

U.S. PATENT DOCUMENTS

3,846,812 11/1974 Biber ................................ 354/145.1
4,400,074 8/1983 Akiyama et al. ..................... 354/214

FOREIGN PATENT DOCUMENTS

53-11377 4/1978 Japan .

Primary Examiner—L. T. Hix
Assistant Examiner—David M. Gray
Attorney, Agent, or Firm—Louis Weinstein

[57] ABSTRACT

A film end detector produces a film end signal as being a film end when a timer which initiates a timing operation in synchronism with initiation of a power supply to a film winding motor is not reset within a given detection period and is capable of changing the detection period in accordance with a camera condition. The detection period can be changed in accordance with a power voltage, a temperature, a simultaneous charging to an electronic flash unit or the like. This makes it possible to properly detect the film end in accordance with a camera condition and to effectively prevent an error in the detection of the film end.

13 Claims, 16 Drawing Figures

FILM END DETECTOR FOR USE IN CAMERAS

BACKGROUND OF THE INVENTION

The present invention relates to a film end detector for use in cameras, and more particularly, to a film end detector disposed in a camera in which a film is wound by an electric motor.

Recently, an automatic film winding camera with a built-in electric motor has been widely used. In a conventional camera of the type, a film winding motor is automatically driven in response to the completion of a shutter operation and is automatically stopped in response to the completion of transport of a film length corresponding to one frame. Accordingly, the motor, even after an effective one frame of the film has been exposed, is driven when the shutter operation is completed to run idle without being able to further wind another one frame of the film, disadvantageously resulting in that a power may be dissipated or the film may be cut. Such disadvantages may be caused even when a film is accidentally caught within a camera.

To prevent such disadvantages, a conventional film winding camera with a motor is provided with a film end detector which detects a film end by a disabled condition of the motor. A conventional film end detector of the kind has a timer circuit in which a timing operation is initiated whenever the film winding motor starts its running and is reset whenever the one frame transport of a film is completed. Such a film end detector detects the film end when the timer circuit is not reset within a predetermined period.

However, the film end detector has a variety of disadvantages since the predetermined period is fixed. For example, when the film winding camera with a motor is further provided with a built-in electronic flash unit, the film transport performed while charging the flash unit requires a longer time period than without charging the flash unit so that the film end may be erroneously detected since the timer circuit is not reset even when in excess of the predetermined period. Because a dry cell, which is commonly used in the camera as a power source, supplies the motor with power while charging a main capacitor of the flash unit so that a supply current to the motor may decrease and the rotational torque thereof may be lowered.

Furthermore, the rotational torque of the motor also decreases when the dry cell is consumed so that the film transport may generally require a gradually increased period. This will result in an erroneous detection of the film end.

Still furthermore, a supply current from the dry cell to the motor will decrease at a low temperature, similarly causing an erroneous detection.

To prevent such erroneous detections, a method of previously setting a little longer period than the predetermined one may be considered. However, this method will be disadvantageous because of a delay of the detection of actual film end.

SUMMARY OF THE INVENTION

It is an object of the invention, in view of the foregoing, to provide a film end detector for use in a camera in which a timer means which initiates its timing operation at the initiation of feeding a film winding motor detects a film end whenever not being reset within a predetermined period for the detection, the predetermined period being variable in accordance with a condition of the camera.

According to the invention, since a predetermined period for detecting the film end is variable in accordance with a condition of a camera, it is possible to provide a film end detector for use in a camera which is able to always detect a proper film end and thus precludes the possibility of causing an erroneous detection.

DESCRIPTION OF THE PREFERRED EMBODIMENTS

Figure 1:
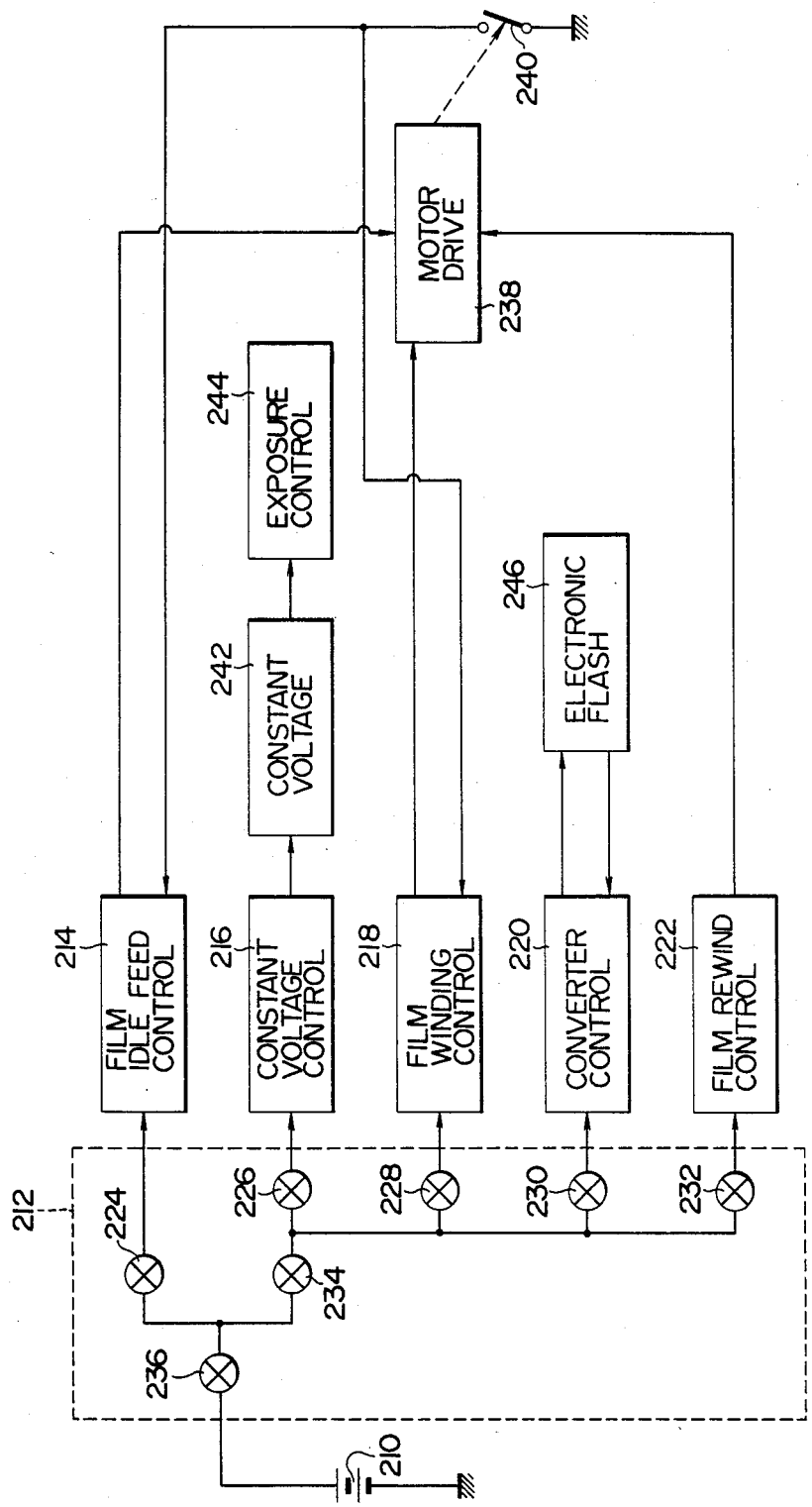
FIG. 1 is a block diagram of an electric circuit for a motor driven camera which includes a film end detector illustrating an embodiment of the invention.

Referring to FIG. 1, there is provided a dry cell 210 as a power supply whose negative pole is connected to the ground and whose positive pole is connected through a gate circuit 212 to a film idle feed control circuit 214, a constant voltage control circuit 216, a film winding control circuit 218, a converter control circuit 220 and a film rewind control circuit 222. The gate circuit 212 includes analog switches 224, 226, 228, 230 and 232 which are connected to the above control circuits 214, 216, 218, 220 and 222 respectively, an analog switch 234 which is connected to the analog switches 226, 228, 230 and 232 and an analog switch 236 which is connected between the positive pole of the dry cell 210 and the analog switches 224 and 234.

The analog switch 236 is controlled by an output of a film detector (not shown) and is turned on when film is loaded in to the camera. The analog switches 224 and 234 operate under control of the opening and closing operations of a rear lid of a camera. Specifically, the analog switch 224 is turned on for the moment the rear lid is closed and the analog switch 234 is turned on while the rear lid is closed. The analog switches 226 and 228 operate under control of a shutter release button, the switch 226 being turned on while the release button is depressed and the switch 228 being turned on for the moment the release button returns from its depressed condition to a normal position. The analog switch 230 is turned on for the moment when a main switch for an electronic flash unit is closed and also is turned on for the when a film winding is completed while the main switch is closed. The analog switch 232 is turned on for a moment when rewind switch is closed.

The film idle feed control circuit 214 supplies an idle feed signal which indicates a motor run in its regular direction for the film idle feed to a motor drive circuit 238. A switch 240 operates under control of with the film winding operation and is turned on whenever a film length corresponding to one frame is completely wound. The switch 240 is electrically connected to the film idle feed control circuit 214 and the winding control circuit 218 for supplying a winding completion signal to both circuits 214 and 218 by turning on whenever one frame of the film is wound by the motor. The constant voltage control circuit 216 supplies its output signal to a constant voltage circuit 242 which in turn supplies a constant voltage to an exposure control circuit 244. The winding control circuit 218 supplies a film winding signal which represents a motor run in its regular direction to the motor drive circuit 238. The converter control circuit 220 supplies a charging signal to an electronic flash circuit 246. The electronic flash circuit 246 supplies a charge completion signal to the converter control circuit 220 when a main capacitor has been charged to a predetermined voltage. The rewind control circuit 222 supplies a film rewind signal which represents a reversing signal to the motor drive circuit 238.

With a camera constructed as described above, when a film is not loaded in the camera the analog switch 236 is open so that each of control circuits 214, 216, 218, 220 and 222 is not supplied with a power so that even if a release button is depressed the power will not be dissipated.

Only when a film is loaded in the camera, each of control circuits 214, 216, 218, 220 and 222 is operated in the following order. First, when a film is loaded in the camera and the rear lid is closed, the analog switch 236 turns on and the analog switch 224 turns on for a moment, resulting in the idle feed control circuit 214 being connected to the power supply for a moment. Thereupon, the idle feed control circuit 214 initiates to supply a film idle feed signal which represents the regular directional run to the motor drive circuit 238 which in turn rotates the motor to wind the film for the idle feed. Whenever the film is wound by one frame, the switch 240 which is in cooperation with a film winding operation is closed so that a film wind completion signal is inputted into the idle feed control circuit 214. The circuit 214 counts the number of inputs of the film wind completion signals and stops the supply of the film idle feed signals to the motor drive circuit 238 when the number reaches three. The motor is deactivated when the film has been wound by a film length corresponding to three frames and thus the film idle feed is completed.

When the rear lid is closed, the analog switch 234 turns on. Under this condition, when the main switch for the electronic flash unit is closed, the analog switch 230 turns on for a moment so that the converter control circuit 220 is connected to the power supply for a moment. Thereupon, the converter control circuit 220 operates to supply a charging signal to the electronic flash circuit 246. As a result, the flash circuit 246 is activated to boost the power voltage and to initiate to charge the main capacitor. Upon charging the main capacitor to a predetermined voltage, the flash circuit 246 supplies a charge completion signal to the converter control circuit 220 which in turn stops the supply of the charging signal to the flash circuit 246. Consequently, the flash circuit 246 is deactivated and the charging is completed with the main capacitor charged to the predetermined voltage. Thus, the charging to the main capacitor is conducted only for the minimum period required and thereby a power dissipation will be prevented.

Subsequently, when the shutter release button is depressed to take a picture, the analog switch 226 turns on to connect the power supply to the constant voltage control circuit 216. As a result, the constant voltage circuit 242 is activated through the constant voltage control circuit 216 to supply a constant voltage to the exposure control circuit 244. The exposure control circuit 244, which is commonly comprises an integrated circuit, is activated by the constant voltage. After that, a shutter speed and a diaphragm aperture of the camera are controlled by an output of the exposure control circuit 244 and a photographing with a proper exposure is conducted. When the light amount from an object being photographed is insufficient, a flash photographing is conducted. In this case, the flash circuit 246 operates in synchronism with the full opening of the shutter to emit a flashlight by permitting the charge in the main capacitor to be discharged through a flash discharge tube. It is to be noted that while in operation of the shutter, the shutter release button is kept in its depressed condition.

Upon completion of the shutter operation, the analog switch 228 turns on for a moment in cooperation with return of the shutter release button to its normal position. Thereby, the winding control circuit 218 is connected to the power supply for a moment to initiate to supply a film winding signal which represents a regular directional run to the motor drive circuit 238. Thereupon, the motor drive circuit 238 drives the motor to wind a film. When the film is wound by a film length of one frame which has been photographed, the switch 240 is closed to input a winding completion signal into the winding control circuit 218. As a result, the winding control circuit 218 interrupts to supply a film winding signal to the motor drive circuit 238 which in turn deactivates the motor with the film being wound by one frame length. When the main switch of the flash unit is closed at the time the film winding has been completed, the analog switch 230 turns on for a moment in synchronism with the completion of the film winding and the charging to the main capacitor is successively conducted in a manner similar to the time when the film idle feed is completed.

As such, while a film has been loaded in the camera, a photographing with an automatic exposure (when the main switch of the flash unit is closed, a flashlight is emitted), an automatic film winding and the charging to the main capacitor (only when the main switch of the flash unit is closed) are automatically sequentially conducted whenever the shutter release button is depressed.

The charging of the main capacitor is conducted after the film winding has been completed but is not conducted simultaneously with the film winding. The reason of this in that the motor running and the charging to the main capacitor have a heavy load to the power supply so that the latter may be excessively consumed while in simultaneous loading, resulting in shortening of the life of the power supply.

When the film is successively wound until the film end as the photographing goes on, a warning to the film end condition is issued. A film rewind switch is closed by a manual operation responsive to the warning. Thereby, the analog switch 232 turns on and the rewind control circuit 222 initiates to supply a film rewind signal which represents a reverse rotation to the motor drive circuit 238 which in turn drives the motor in the reverse direction to rewind the film. When the film is completely rewound into a cartridge, the camera assumes the condition equivalent to the film unloaded condition, causing the analog switch 236 to be open. As a result, each circuit of the camera is broken from the power supply, thereafter prevent the latter from being further consumed. Thus, since the power supply is controlled depending on the existence of a film loaded in the camera, there is no waste of the power supply.

Each circuit shown in FIG. 1 will be described further hereinafter in detail.

Figure 2:
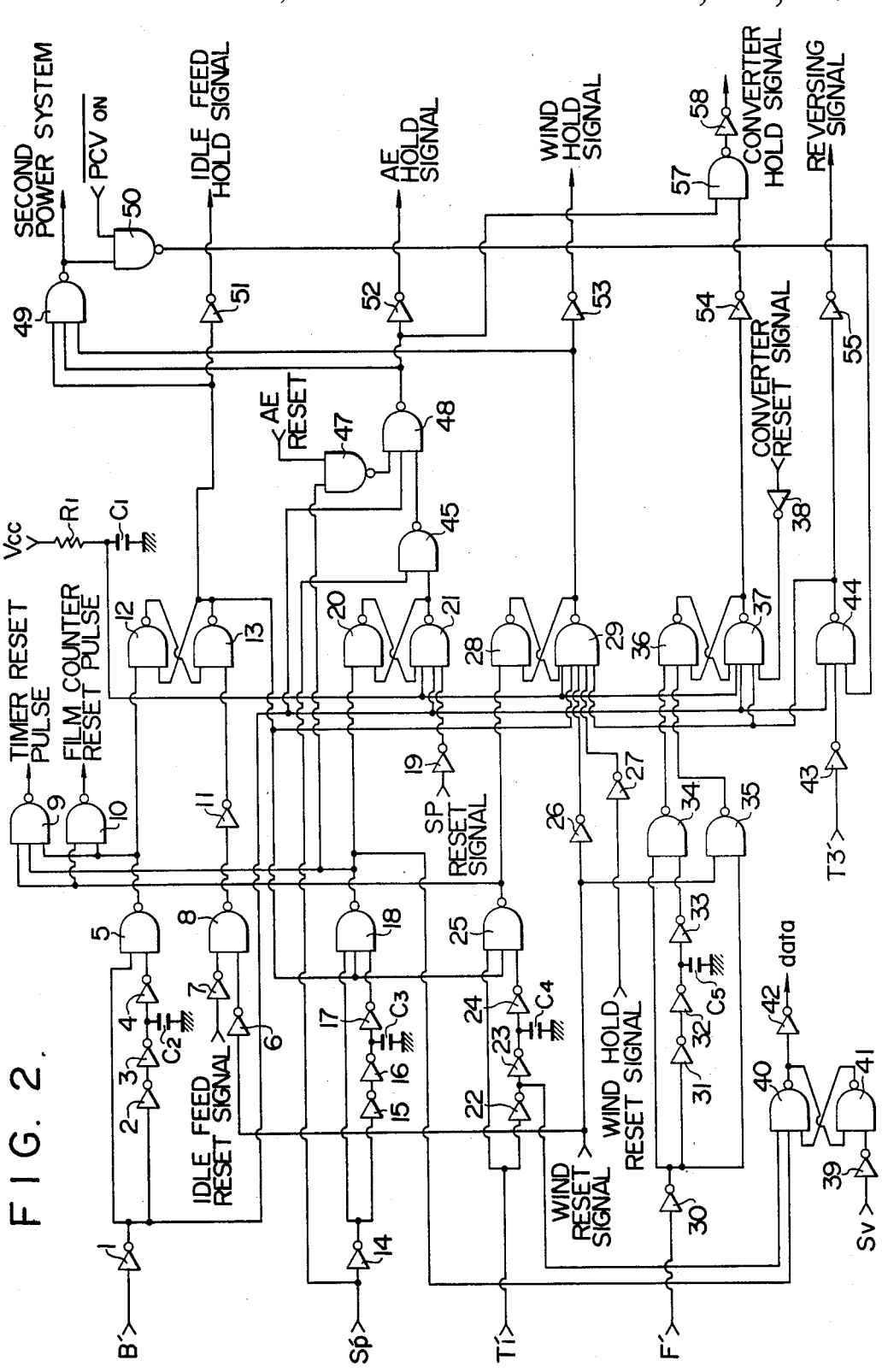
FIG. 2 is an electric circuit diagram of a first power supply system in the camera shown in FIG. 1.
Figure 3:
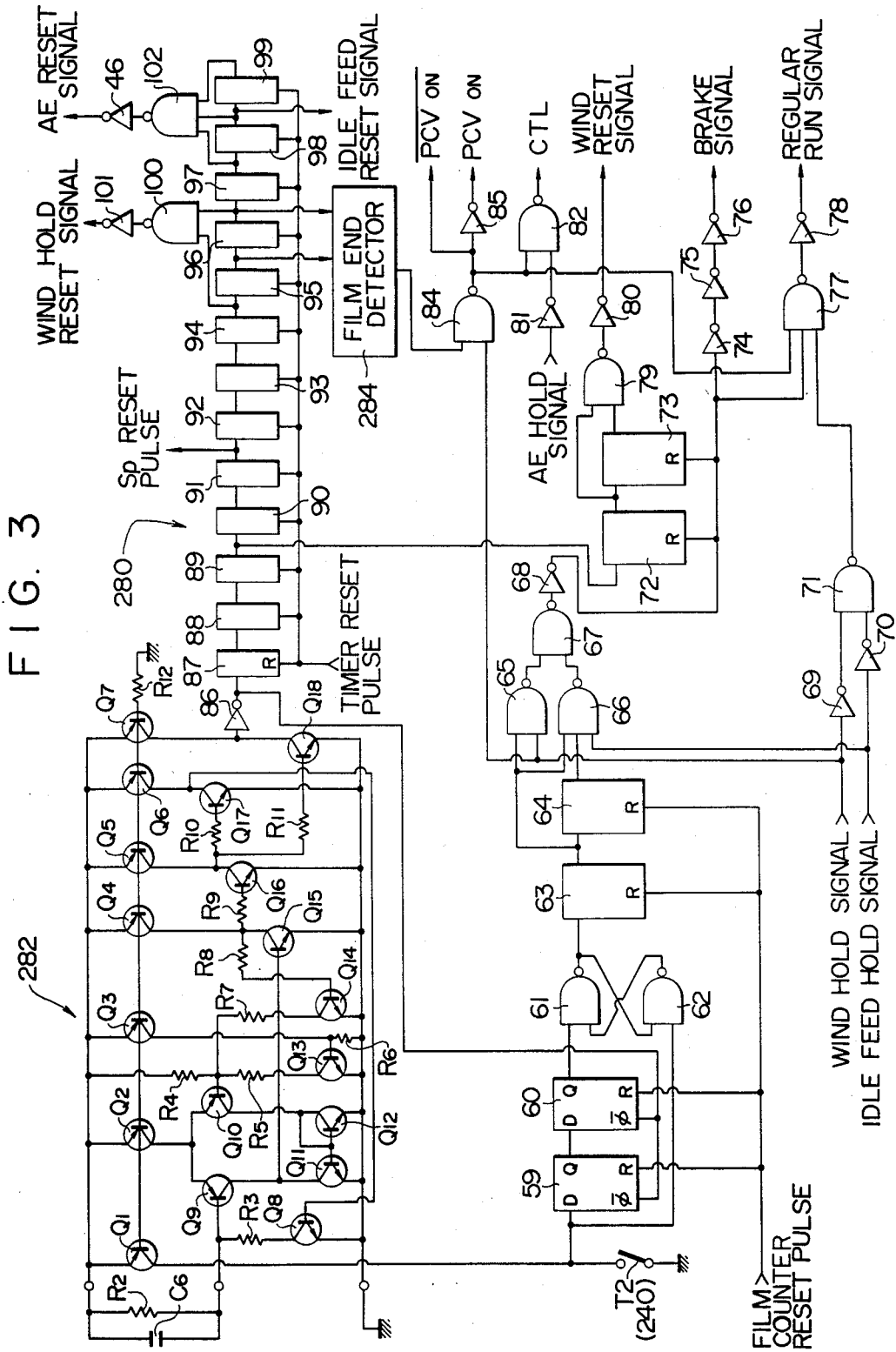
FIG. 3 is an electric circuit diagram of a second power supply system in the camera shown in FIG. 1.
Figure 4:
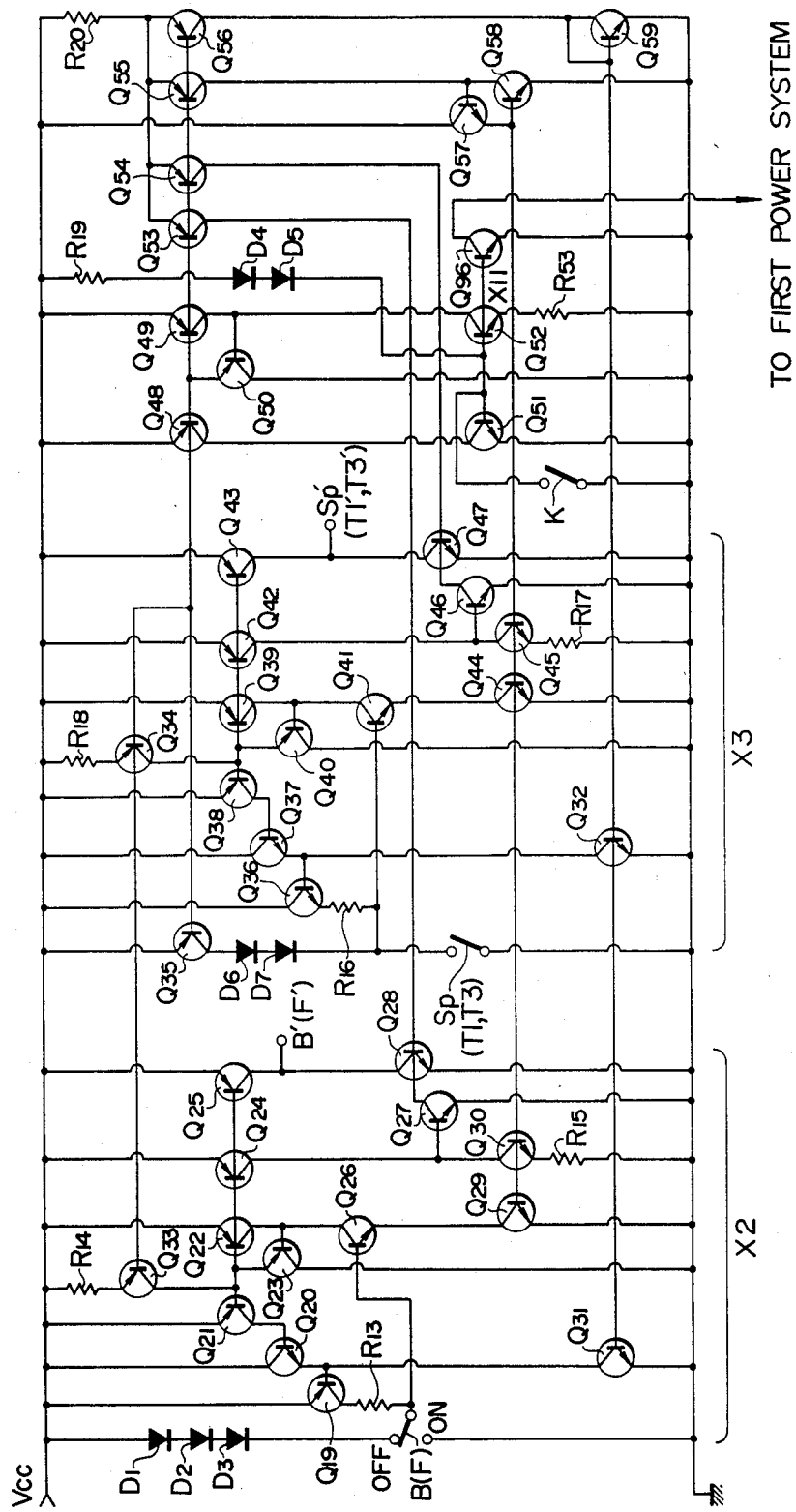
FIG. 4 is a wiring diagram of a control signal feed circuit in the camera shown in FIG. 1.

FIGS. 2 to 4 correspond to the gate circuit 212, specifically control circuits 214, 216, 218, 220 and 222. The circuits shown in FIGS. 2 and 3 are referred to hereinafter as a first and a second power system, respectively. FIG. 4 shows a circuit for supplying control signals to the gates shown in FIGS. 2 and 3. The first power system circuit is activated with a power supplied only when a film detection switch K (FIG. 4) opens. The second power system circuit is activated with a power supplied only when the first power system circuit is activated and further a given condition which will be detailed later is satisfied. The switch K opens when a film is loaded in the camera and closed when a film is not loaded.

Control signals B', Sp', T1', F' and T3' shown in FIG. 2 are produced in response to the opening and closing of switches B, Sp, T1, F and T3 shown in FIG. 4, respectively. FIG. 4 illustrates the switch B and a signal supply circuit which produces a control signal B' in cooperation with the switch B. The illustration of the switch F and its signal supply circuit which produces a control signal F' in cooperation with the switch F, as the circuit is of the same construction as the circuit associated with switch B, is omitted by indicating it with "x2" at its lower side. Similarly, the illustrations of the switch Sp and its signal supply circuit which produces a control signal Sp' in cooperation with the switch Sp and the switches T1 and T3 and their control signal circuits which produce control signals T1' and T3' in cooperation therewith, as these circuits are of the same construction, are omitted by indicating them with "x3" at their lower sides.

The rear lid switch B turns on when the rear lid of the camera is closed. The release switch Sp and the wind initiation switch T1 cooperate with the shutter release button. The switch Sp turns on when the shutter release button is depressed and the switch T1 turns on when the shutter release button returns. The main switch F for an electronic flash unit and the film rewind switch T3 are manually operated.

The film detection switch K has one end connected to the ground and the other end connected to the bases of NPN type transistors Q51 and Q52. The transistor Q51 has its emitter connected to the ground and its collector connected to the collector of PNP type transistor Q48. The transistor Q52 has its emitter connected through a resistor R53 to the ground and its collector connected to the collector of PNP transistor Q49 and the base of PNP transistor Q50. The bases of transistors Q51 and Q52 are connected to a power supply Vcc through diodes D5, D4 and resistor R19 and further to the base of NPN transistor Q96. The transistor Q96 has its emitter connected to the ground and its collector connected to the first power system circuit shown in FIG. 2. The transistor Q48 has its emitter connected to the power supply Vcc and its base connected to the base of transistor Q49 and the emitter of transistor Q50. Transistor Q50 has its collector connected to the ground and transistor Q49 has its emitter connected to the power supply Vcc.

The base of transistor Q49 is further connected to the bases of PNP transistors Q53, Q54, Q55 and Q56. The emitters of transistors Q53, Q54, Q55 and Q56 are coupled together and connected through a resistor R20 to the power supply Vcc. Transistor Q53 has its collector connected to the base of NPN transistor Q28, transistor Q54 has its collector connected to the base of NPN transistor Q47, transistor Q55 has its collector connected to the base of NPN transistor Q57 and the collector of NPN transistor Q58 and transistor Q56 has its collector connected to the collector and base of NPN transistor Q59. Transistor Q57 has its collector connected to the power supply Vcc and its emitter connected to the base of transistor Q58. Transistor Q58 has its base connected to the base of NPN transistor Q45 and its emitter connected to the ground. Transistor Q59 has its base connected to the base of NPN transistor Q32 and its emitter connected to the ground.

The rear lid switch B and the main switch F for the flash unit have their "ON" terminals connected to the ground and their "OFF" terminals connected to the power supply Vcc through diodes D3, D2 and D1 in a series relationship and the opposite direction. Their movable contact terminals are connected through resistor R13 to the collector of PNP transistor Q19 as well as the base of NPN transistor Q26. Transistor Q19 has its emitter connected to the power supply Vcc and its base connected to the emitter of NPN transistor Q20 as well as the collector of NPN transistor Q31. Transistor Q31 has its emitter connected to the ground and its base connected to the base of the transistor Q59. Transistor Q20 has its collector connected to the power supply Vcc and its base connected to the collector of PNP transistor Q21. Transistor Q21 has its emitter connected to the power supply Vcc and its base connected to the collector of PNP transistor Q33, the base of PNP transistor Q22 and the emitter of PNP transistor Q23. Transistor Q33 has its emitter connected through resistor R14 to the power supply Vcc and its base connected to the base of the transistor Q48. Transistor Q22 has its emitter connected to the power supply Vcc and its collector connected to the base of transistor Q23 as well as the collector of transistor Q26. Transistor Q23 has its collector connected to the ground and transistor Q26 has its emitter connected to the collector of NPN transistor Q29. Transistor Q29 has its emitter connected to the ground and its base connected to the base of the transistor Q58. The transistor Q21 has its base further connected to the bases of PNP transistors Q24 and Q25. Transistor Q24 has its emitter connected to the power supply Vcc and its collector connected to the base of NPN transistor Q27 and the collector of NPN transistor Q30. Transistor Q30 has its emitter connected through a resistor R15 to the ground and its base connected to the base of the transistor Q58. The transistor Q27 has its emitter connected to the ground and its collector connected to the base of NPN transistor Q28. The transistor Q25 has its emitter connected to the power supply Vcc and its collector connected to the collector of transistor Q28. The transistor Q28 has its emitter connected to the ground and its base connected to the collector of transistor Q53. In the circuit arrangement just described above, the control signal B' or F' can be obtained from the junction between the collectors of the transistor Q25 and the transistor Q28.

The release switch Sp, wind initiation switch T1 and rewind switch T3 have one of their ends connected to the ground and their other ends connected to the collector of PNP transistor Q35 through diodes D7, D6 in a series relationship and the opposite direction as well as to the emitter of NPN transistor Q36 through a resistor R16 and further connected to the base of NPN transistor Q41. The transistor Q35 has its emitter connected to the power supply Vcc and its base connected to the base of the transistor Q48. The transistor Q36 has its emitter connected to the power supply Vcc and its base connected to the emitter of NPN transistor Q37 and the collector of NPN transistor Q32. The transistor Q32 has its emitter connected to the ground and its base connected to the base of the transistor Q59. The transistor Q37 has its collector connected to the power supply Vcc and its base connected to the collector of PNP transistor Q38. The transistor Q38 has its emitter connected to the power supply Vcc and its base connected to the collector of PNP transistor Q34, the base of PNP transistor Q39 and the emitter of PNP transistor Q40. The transistor Q34 has its emitter connected through a resistor R18 to the power supply Vcc and its base connected to the base of the transistor Q48. The transistor Q39 has its emitter connected to the power supply Vcc and its collector connected to the base of the transistor Q40 and the collector of the transistor Q41. The transistor Q40 has its collector connected to the ground and the transistor Q41 has its emitter connected to the collector of NPN transistor Q44. The transistor Q44 has its emitter connected to the ground and its base connected to the base of the transistor Q58. The transistor Q38 has its base connected to the bases of PNP transistors Q42 and Q43. The transistor Q42 has its emitter connected to the power supply Vcc and its collector connected to the base of NPN transistor Q46 as well as the collector of NPN transistor Q45. The transistor Q45 has its emitter connected through a resistor R17 to the ground and its base connected to the base of the transistor Q58. The transistor Q46 has its emitter connected to the ground and its collector connected to the base of NPN transistor Q47. The transistor Q43 has its emitter connected to the power supply Vcc and its collector connected to the collector of the transistor Q47. The transistor Q47 has its emitter connected to the ground and its base connected to the collector of the transistor Q54. In the circuit arrangement just described above, the control signals Sp', T1' or T3' can be obtained from the junction between the collectors of the transistors Q43 and Q47.

While the switch K is closed, namely a film is not loaded in the camera, the transistors Q51, Q52 and Q96 are cut off so that a collector signal of the transistor Q96, which represents a power supply signal, is not transmitted to the first power system circuit shown in FIG. 2, resulting in deactivation of the latter. Thus, a power dissipation while a film is not loaded in the camera can be prevented.

When the switch K open by loading a film into the camera, a current flows from the power supply Vcc between the bases and emitters of the transistors Q51, Q52 and Q96 through resistor R19 and diodes D4 and D5 to turn these transistors on. Upon turning the transistor Q96 on, a power supply signal is transmitted to the first power system circuit (FIG. 2) to activate it. On the other hand, upon turning the transistors Q51 and Q52 on, the transistors Q48, Q49 and Q50 turn on and in turn the transistors Q33, Q34, Q35, Q53, Q54, Q55 and Q56 turn on. The transistors Q28, Q47, Q57, Q58, Q29, Q30, Q44, Q45, Q31, Q32 and Q59 further turn on to activate the signal supply circuits of the switch B, F, Sp, T1 and T3.

Assume that the rear lid switch B and the main switch F are off when their movable contacts are connected to a terminal at the power supply Vcc and are on when they are connected to the ground. Then, when the switch B or F is off, the transistors Q26, Q19, Q20, Q21, Q23, Q22, Q24 and Q25 turn on. Upon turning the transistor Q24 on, the transistor Q27 also turns on and the transistor Q28 turns off. As a result, the control signal B' or F' attains the power voltage level Vcc. Conversely, when the switch B or F is on, the transistor Q26 turns off so that the transistors Q23, Q22, Q24, Q25, Q21, Q20 and Q19 turn off. When the transistor Q24 turns off, the transistor Q27 also turns off and the transistor Q28 turns on. As a result, the control signal B' or F' attains the ground potential level.

Similarly, when the switch Sp, T1 or T3 is off, the transistor Q43 turns on and the transistor Q47 turns off so that the control signal Sp', T1' or T3' attains the power voltage level. When the switch Sp, T1 or T3 is on, the transistor Q43 turns off and the transistor Q47 turns on so that the control signal Sp', T1' or T3' attains the ground potential level.

Thus, control signals B', F', Sp', T1' and T3' are switched from the power voltage level Vcc to the ground potential level by switching respective switches B, F, Sp, T1 and T3 from their OFF condition to their ON condition.

In the first power system circuit shown in FIG. 2, the control signals B', F', Sp', T1' and T3' are inputted into the input terminal of an inverter 1, the input terminal of an inverter 30, the input terminal of an inverter 14 and one input terminal of a NAND gate 45, the input terminal of an inverter 22 and a first input terminal of a NAND gate 25, and the input terminal of an inverter 43, respectively.

The output terminal of the inverter 1 into which the control signal B' is inputted is connected to one input terminal of a NAND gate 5, the input terminal of an inverter 2, a second input terminal of a NAND gate 48, a third input terminal of a NAND gate 21, a third input terminal of a NAND gate 37 and a first input terminal of a NAND gate 44. The output terminal of the inverter 2 is connected to the other input terminal of the NAND gate 5 through inverters 3 and 4 in series and the output terminal of the inverter 3 is connected through a capacitor C2 to the ground. The output terminal of NAND gate 5 is connected to a third input terminal of a NAND gate 9, the other input terminal of the NAND gate 10 and one input terminal of a NAND gate 12.

The output terminal of the inverter 14 into which the control signal Sp' is inputted is connected to a first input terminal of a NAND gate 18 and the input terminal of an inverter 15. The output terminal of the inverter 15 is connected through inverters 16 and 17 in series to a third input terminal of a NAND gate 18. The output terminal of an inverter 16 is connected through a capacitor C3 to the ground. A second input terminal of the NAND gate 18 is connected to the output terminal of a NAND gate 13. The output terminal of the NAND gate 18 is connected to a second input terminal of a NAND gate 9, the other input terminal of the NAND gate 47, one input terminal of a NAND gate 20 and a second input terminal of a NAND gate 40.

The output terminal of the inverter 22 into which the control signal T1' is inputted is connected through inverters 23 and 24 in series to a third input terminal of a NAND gate 25 as well as to a first input terminal of the NAND gate 40. The output terminal of the inverter 23 is connected through a capacitor C4 to the ground. A second input terminal of the NAND gate 25 is connected to the output terminal of a NAND gate 13. The output terminal of the NAND gate 25 is connected to a first input terminal of a NAND gate 9, one input terminal of a NAND gate 10 and one input terminal of a NAND gate 28.

The output terminal of the inverter 30 into which the control signal F' is inputted is connected to one input terminal of a NAND gate 34, an input terminal of inverter 31 and the other input terminal of a NAND gate 34, an input terminal of inverter 31 and the other input terminal of a NAND gate 35. The output terminal of inverter 31 is connected through inverters 32 and 33 in series to the other input terminal of the NAND gate 34 and the output terminal of inverter 32 is connected through a capacitor C5 to the ground. The output terminal of NAND gate 34 is connected to a first input terminal of a NAND gate 36.

The output terminal of the inverter 43 into which the control signal T3' is inputted is connected to a second input terminal of a NAND gate 44.

Inputs to the first power system circuit are a film idle feed reset signal, a wind reset signal, a wind hold reset signal, a release (Sp) reset signal, an automatic exposure (AE) reset signal, a converter reset signal and the like in addition to the control signals B', F', Sp', T1' and T3'. The idle feed reset signal is applied to the input terminal of an inverter 7 and the output terminal thereof is connected to one input terminal of a NAND gate 8. The wind reset signal is applied to an input terminal of an inverter 6, an input terminal of an inverter 26 and one input terminal of a NAND gate 35. The output terminal of the inverter 6 is connected to the other input terminal of the NAND gate 8 and the output terminal of the latter is connected through an inverter 11 to the other input terminal of a NAND gate 13. The output terminal of inverter 26 is connected to a fourth input terminal of NAND gate 29 and the output terminal of NAND gate 35 is connected to a second input terminal of NAND gate 36. The wind hold reset signal is connected through an inverter 27 to a fifth input terminal of NAND gate 29.

The output terminal of the NAND gate 12 is connected to one input terminal of NAND gate 13 and the output terminal of the latter is connected to the other input terminal of NAND gate 12. The output terminal of NAND gate 13 is further connected to a second input terminal of NAND gate 18, a second input terminal of NAND gate 25, a third input terminal of NAND gate 29, a first input terminal of a NAND gate 49 and an input terminal of an inverter 51.

The release (Sp) reset signal is applied through an inverter 19 to a fourth input terminal of NAND gate 21. The output terminal of NAND gate 21 is connected to the other input terminal of NAND gate 45 and the other input terminal of NAND gate 20. The output terminal of NAND gate 20 is connected to a first input terminal of NAND gate 21. The output terminal of the NAND gate 45 is connected to a third input terminal of a NAND gate 48.

The automatic exposure (AE) reset signal is applied to one input terminal of a NAND gate 47 and the output terminal of the latter is connected to a first input terminal of NAND gate 48. The output terminal of the NAND gate 48 is connected to a second input terminal of a NAND gate 49, an input terminal of an inverter 52 and one input terminal of a NAND gate 57.

The output terminal of the NAND gate 28 is connected to a first input terminal of NAND gate 29 and the output terminal of the latter is connected to the other input terminal of the NAND gate 28, a third input terminal of the NAND gate 49 and an input terminal of an inverter 53. The output terminal of the NAND gate 49 is connected to the other input terminal of a NAND gate 50 and the second power system circuit shown in FIG. 3 to serve as an output terminal of a power supply signal thereto. An inverted signal "PCV$_{ON}$" on an "ON" signal of a sounding element (for example, a piezo-electric ceramic vibrator (PCV)) is applied to one input terminal of NAND gate 50 and the output terminal of the latter is connected to a third input terminal of NAND gate 44.

The output terminal of the NAND gate 36 is connected to a first input terminal of a NAND gate 37 and the output terminal of the latter is connected to a third input terminal of NAND gate 36 and the other input terminal of the NAND gate 57 through an inverter 54. The output terminal of the NAND gate 57 is connected to an input terminal of an inverter 58. The converter reset signal is applied through an inverter 38 to a fifth input terminal of NAND gate 37. The output terminal of NAND gate 44 is connected to a sixth input terminal of NAND gate 29, a fourth input terminal of NAND gate 37 and the input terminal of an inverter 55. A second input terminal of NAND gate 21, a second input terminal of NAND gate 29 and a second input terminal of NAND gate 37 are connected to the junction between a resistor R1 and a capacitor C1 which are connected in series between the power supply Vcc and the ground.

The output terminal of the NAND gate 40 is connected to one input terminal of the NAND gate 41 the output terminal of which is connected to a third input terminal of the NAND gate 40. The shutter release synchronizing signal Sv is applied through an inverter 39 to the other input terminal of the NAND gate 41. The output terminal of NAND gate 40 is further connected to the input terminal of an inverter 42. The inverter 42 produces a trigger signal "data" to a data recorder of the camera at its output terminal.

In the first power system circuit constructed just described above, when each control signal B', Sp', T1' or F' which is produced from the control signal supply circuit shown in FIG. 4 is changed from the power voltage level Vcc (hereinafter referred to as a "H" level) to the ground potential level (hereinafter referred to as a "L" level), an "L" level pulse of a given pulse width is produced from each NAND gate 5, 18, 25 or 34. Each signal will be explained hereinafter in terms of the positive logic.

First, when a film is loaded in the camera and then a rear lid is closed, the rear lid switch B turns on to change the control signal B' from the "H" level to the "L" level, resulting in that an output of the NAND gate 5 is at the "L" level only for a time period determined by the capacitor C2. The flip-flop circuit including the NAND gates 12 and 13 is set by this negative pulse and an output of the NAND gate 13 changes to the "L"

level. As a result, the idle feed hold signal at the "H" level is produced from the inverter 51. The idle feed hold signal is hereinafter referred to as a signal at the "H" level for holding an operation of each control circuit. In addition, since an output of NAND gate 13 changes to the "L" level and hence an output of NAND gate 49 also changes to the "H" level, an output of the latter is transmitted to the second power system circuit shown in FIG. 3 as a power supply signal to activate it. Also, since an "L" level pulse is produced from the NAND gate 5, a timer reset pulse and a counter reset pulse are produced by the NAND gates 9 and 10, respectively.

Further, when the main switch F for the electronic flash unit changes on, the control signal F' turns from the "H" level to the "L" level so that an output of the NAND gate 34 changes to the "L" level only for a time period determined by the capacitor C5. By the "L" level pulse, a flip-flop circuit including the NAND gates 36 and 37 is set and an output of the NAND gate 37 changes to the "L" level. As a result, the converter hold signal at the "H" level is produced through the inverter 54, NAND gate 57 and inverter 58.

Subsequently, when the shutter release button is depressed, the release switch Sp turns on to change the control signal Sp' from the "H" level to the "L" level so that an output of the NAND gate 18 is at the "L" level only for a time period determined by the capacitor C3. By this "L" level pulse, a flip-flop circuit including the NAND gates 20 and 21 is set and the automatic exposure (AE) hold signal at the "H" level is produced through the NAND gates 45, 48 and inverter 52.

Furthermore, when the shutter release button returns to its normal position, the wind initiation switch T1 turns on to change the control signal T1' from the "H" level to the "L" level so that an output of the NAND gate 25 is at the "L" level only for a time period determined by the capacitor C4. Accordingly, a flip-flop circuit including NAND gates 28 and 29 is set and an output of the NAND gate 29 changes to the "L" level to produce the wind hold signal at a "H" level from the inverter 53.

When the rewind switch T3 is closed, the control signal T3' changes from the "H" level to the "L" level so that a reversing signal at the "H" level as a film rewind signal is produced through the inverter 43, NAND gate 44 and inverter 55.

In the second power system circuit shown in FIG. 3, timer reset pulses which are produced from the first power system circuit shown in FIG. 2 are applied to respective reset signal input terminals of flipflops 87 to 99. A film counter reset pulse is applied to a reset signal input terminal of each of the flip-flops 59, 60 and 63, 64. The flip-flops 87 to 99 arranged in cascade form a timer 280 which effects a timing operation by counting output pulses from an oscillator 282 through an inverter 86. The oscillator 282 comprises a capacitor C6, resistors R2 to R12 and transistors Q1 to Q18 which are connected as shown in FIG. 3 and 282 oscillates with a frequency determined by capacitor C6 and resistor R2. The oscillator 282 is not related to the subject matter of the present invention and therefore its detailed description will be omitted.

The output terminal of the third stage flip-flop 89 of the timer 280 is connected to the input terminal of a flip-flop 72. The output terminal of the flip-flop 72 is connected to one input terminal of a NAND gate 79 and the input terminal of a flip-flop 73. The output terminal of the flip-flop 73 is connected to the other input terminal of the NAND gate 79 to output terminal of which is connected to the input terminal of an inverter 80. A wind reset signal is produced from the output terminal of the inverter 80. A release (Sp) reset signal is produced from the output terminal of the fifth stage flip-flop 91.

The output terminal of the eighth stage flip-flop 94 is connected to one input terminal of a NAND gate 100 and the output terminal of the tenth stage flip-flop 96 is connected to the other input terminal of the NAND gate 100. The output terminal of the NAND gate 100 is connected to the input terminal of an inverter 101 the output terminal of which produces a wind hold reset signal. The output terminals of the eleventh, twelfth and thirteenth stage flip-flops 97, 98 and 99 are connected to three input terminals of NAND gate 102, respectively and the output terminal of NAND gate 102 is connected to the input terminal of an inverter 46. An automatic exposure (AE) reset signal is produced from the output terminal of the inverter 46. Also, an idle feed reset signal is produced from the output terminal of the twelfth stage flip-flop 98.

The output terminals of the ninth and tenth stage flip-flops 95 and 96 are connected to respective input terminals of a film end detector 284. The output terminal of the film end detector 284 is connected to one input terminal of a NAND gate 84 and a wind hold signal is applied to the other input terminal of the NAND gate 84. An inverted signal $PCV_{ON}$ to an "ON" signal of the sounding element is produced from the output terminal of the NAND gate 84. The output terminal of NAND gate 84 is connected to the input terminal of an inverter 85, one input terminal of a NAND gate 82 and a first input terminal of a NAND gate 77. The "ON" signal $PCV_{ON}$ of the sounding element is produced from the output terminal of the inverter 85. An automatic exposure (AE) hold signal is applied to the other input terminal of the NAND gate 82 through an inverter 81. A control signal CTL for activating the constant voltage circuit 242 is produced from the output terminal of the NAND gate 82.

The input terminal of the flip-flop 59 is connected to one terminal of a switch T2 (240 in FIG. 1) associated with a film, the other terminal of which is connected to the ground. The one terminal of the switch T2 is further connected to the oscillator 282 and one input terminal of a NAND gate 62. The output terminal of the flip-flop 59 is connected to the input terminal of the flip-flop 60 the output terminal of which is connected to one input terminal of a NAND gate 61. The clock pulse input terminals of the flip-flops 59 and 60 are connected to the output terminal of the inverter 86. The flip-flops 59 and 60 are provided to prevent the switch T2 from chattering. The output terminal of the NAND gate 61 is connected to the input terminal of a flip-flop 63 and the other input terminal of NAND gate 62. The output terminal of the NAND gate 62 is connected to the other input terminal of NAND gate 61. The output terminal of a flip-flop 63 is connected to one input terminal of NAND gate 65, a first input terminal of a NAND gate 66 and the input terminal of a flip-flop 64. The output terminal of the flip-flop 64 is connected to a second input terminal of a NAND gate 66. The flip-flops 63 and 64 form a counter for counting the number of film frames. The wind hold signal is applied to the other input terminal of the NAND gate 65 and the idle feed hold signal is applied to the third input terminal of the NAND gate 66. The output terminal of the NAND gate 65 is connected to one input terminal of a NAND gate 67 and the output terminal of NAND gate 66 is connected to the other input terminal of NAND gate 67. The output terminal of the NAND gate 67 is connected to the input terminal of an inverter 68. The output terminal of the inverter 68 is connected to the reset signal input terminal of flip-flops 72 and 73 and further to the input terminal of an inverter 74 and a second input terminal of a NAND gate 77. The output terminal of the inverter 74 is connected through an inverter 75 to the input terminal of an inverter 76. The inverter 76 produces a brake signal at its output terminal.

The wind hold signal and the idle feed signal are applied through inverters 69 and 70 to one and other input terminals of a NAND gate 71, respectively. The output terminal of the NAND gate 71 is connected to a third input terminal of NAND gate 77. The output terminal of the NAND gate 77 is connected to the input terminal of an inverter 78. The inverter 78 produces a regular direction run signal at its output terminal.

In the second power system circuit just described above, first, when a film is loaded in the camera and then the rear lid is closed, each section of the circuit is supplied with an operation voltage by a power supply signal which is produced from the first power system circuit shown in FIG. 2 to activate it. In addition, the flip-flops 87 to 99, 59, and 63, and 64 are reset by a timer reset pulse and a film counter reset pulse which are produced from the NAND gates 9 and 10 (FIG. 2), respectively. The timer 280 comprising flip-flops 87 to 99 initiates operation to count output pulses of the oscillator 282 which has started to oscillate by the supply of power. Output pulses from the oscillator 282 are further supplied to the clock signal input terminal of the flip-flop 59 and 60 through the inverter 86. Furthermore, with an idle feed hold signal produced from the inverter 51 (FIG. 2), the flip-flops 72, 73 are reset through the NAND gates 66, 67 and the inverter 68 and a regular direction run signal is produced through the inverter 70, NAND gate 71, NAND gate 77 and inverter 78. As a result of this, a motor rotates in the regular direction to initiate a winding for the film idle feed.

Whenever a film length corresponding to one frame is wound, the switch T2 is closed and then is opened in the middle of the winding of the film one frame. Accordingly, the number of times the switch T2 is "on" is counted by means of a counter comprising flip-flops 63 and 64. When the switch T2 turns on three times, both outputs of the flip-flops 63 and 64 turn to the "H" level and an output of the NAND gate 66 turns to the "L" level. Thereby, the reset condition of flip-flops 72 and 73 is released through the inverter 68 and the regular direction run signal is interrupted through the inverter 68, NAND gate 77 and inverter 78. At the same time, a brake signal is produced through inverters 68, 74, 75 and 76. As a result, the motor stops under the condition where the film length corresponding to three frames is idly fed.

After that, after the lapse of a given time both outputs of flip-flops 72 and 73 turn to the "H" level by an output of the flip-flop 89 of the timer 280 which is operating from the initiation of the idle feed, to produce a wind reset signal from the inverter 80. As a result, in FIG. 2, a flip-flop comprising NAND gates 12 and 13 is reset through the inverter 6, NAND gate 8 and inverter 11 and hence an output of the idle feed hold signal is interrupted through inverter 51. Also, an output of the power supply signal to the second power system circuit is interrupted through the NAND gate 49. As a result, the second power system circuit is deactivated. Accordingly, an electromagnetic brake is applied to the motor for an extremely short given period, for example, several tens to several hundreds msec, resulting in that an excessive power will not be consumed. In addition, when something wrong happens while in the idle feed operation to require a long period for winding the three frame length of the film, the flip-flop comprising NAND gates 12 and 13 (FIG. 2) is forcibly reset by the idle feed reset signal which is produced from the flip-flop 98 of the timer 280 and similarly the second power system circuit is deactivated. Thus, even when an accident happens, a power dissipation may be prevented.

Figure 5:
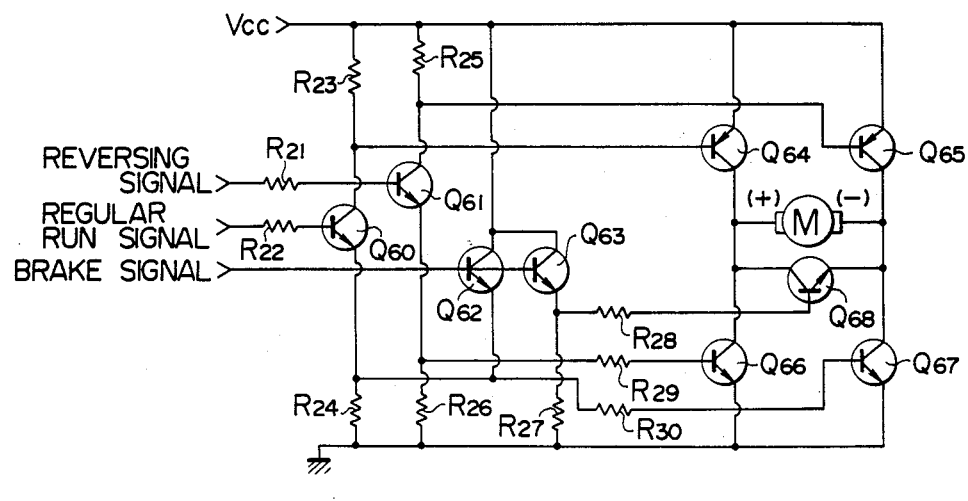
FIG. 5 is a wiring diagram of a motor drive circuit in the camera shown in FIG. 1.

In FIG. 5, which illustrates a detailed diagram of the motor drive circuit 238 shown in FIG. 1, three control signals, namely, a regular direction run signal, a reversing signal and a brake signal, are inputted into the motor drive circuit 238. The regular direction run signal is applied to the base of an NPN transistor Q60 through a resistor R22. The collector of the transistor Q60 is connected through a resistor R23 to the power supply Vcc and the base of a PNP transistor Q64. The emitter of the transistor Q60 is connected through a resistor R24 to the ground and through a resistor 30 to the base of an NPN transistor Q67. The emitter of the transistor Q60 is further connected to the emitter of an NPN transistor Q62. The reversing signal is applied through a resistor R21 to the base of an NPN transistor Q61. The collector of the transistor Q61 is connected through a resistor R25 to the power supply Vcc and the base of a PNP transistor Q65. The emitter of the transistor Q61 is connected through a resistor R26 to the ground and through a resistor R29 to the base of an NPN transistor Q66. The brake signal is applied to the base of each of the NPN transistors Q62 and Q63. The transistor Q62 has its collector connected to the power supply Vcc and its emitter connected through resistor R24 to the ground. The transistor Q63 has its collector connected to the power supply Vcc and its emitter connected through a resistor R27 to the ground and through a resistor R28 to the base of an NPN transistor Q68.

The transistor Q64 has its emitter connected to the power supply Vcc and its collector connected to the positive pole (+) of the motor M for a film wind and rewind operation. The transistor Q65 has its emitter connected to the power supply Vcc and its collector connected to the negative pole of the motor M. The transistor Q66 has its collector connected to the positive pole (+) of the motor M and its emitter connected to the ground. The transistor Q67 has its collector connected to the negative pole (−) of the motor M and its emitter connected to the ground. The transistor Q68 has its collector connected to the positive pole (+) of the motor M and its emitter connected to the negative pole (−) thereof.

In the motor drive circuit 238 just described above, when the regular direction run signal in inputted thereinto, the transistor Q60 turns on and also the transistors Q64 and Q67 turn on. As a result, the motor M has its positive pole (+) connected to the power supply Vcc and its negative pole (−) connected to the ground to rotate in the regular direction and to wind the film. When an input of the regular direction run signal is interrupted and simultaneously the brake signal is applied, the transistor Q61 turns off and in turn the transistors Q64, Q67 turn off to interrupt the supply of power to the motor M. At the same time, the transistors Q62, Q63 turn on and in turn transistors Q67, Q68 turn on. Thus, the motor M is short-circuited between the positive and negative poles (+) (−) and stops by the electromagnetic brake. When the reversing signal is applied, the transistor Q61 turns on and in turn the transistors Q65, Q66 turn on. Thus, the motor M has its positive pole (+) connected to the ground and its negative pole (−) connected to the power supply Vcc. As a result, the motor M rotates in the reverse direction to rewind the film.

Figure 6:
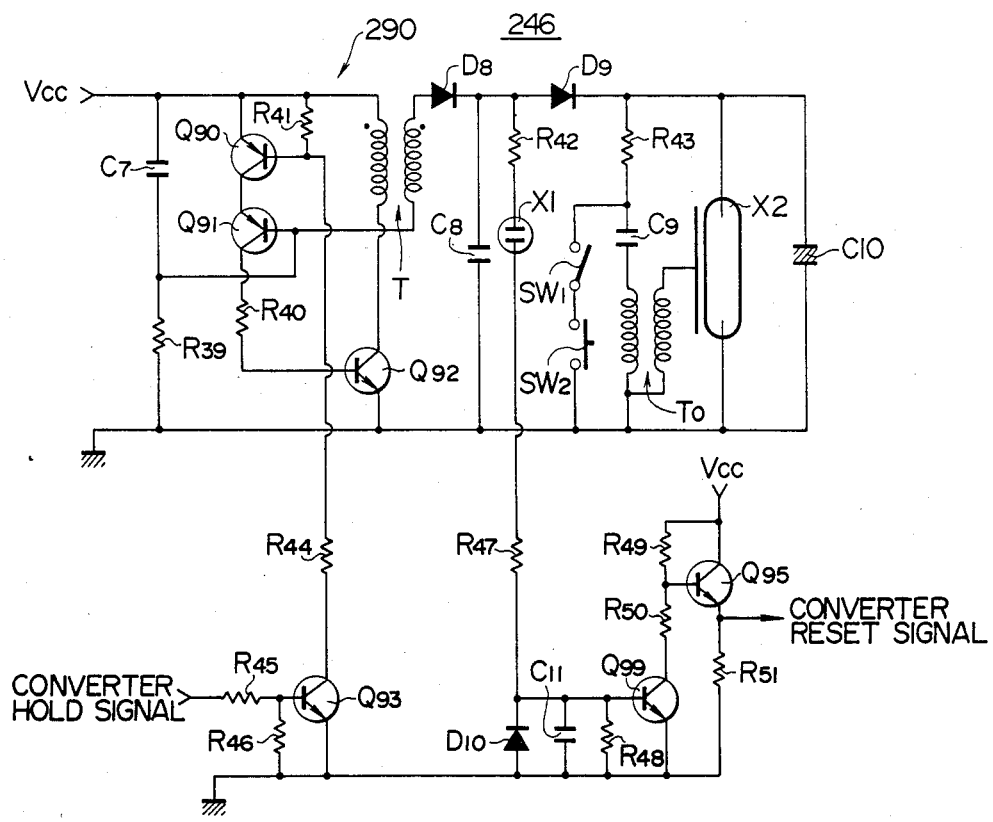
FIG. 6 is a wiring diagram of an electronic flash circuit in the camera shown in FIG. 1.

In FIG. 6, which is a detailed circuit diagram of the electronic flash unit 246 shown in FIG. 1, a converter hold signal is applied to the flash unit circuit 246. The converter hold signal is applied through a resistor R45 to the base of an NPN transistor Q93. The transistor Q93 has its base connected through a resistor R46 to the ground and its emitter directly connected to the ground. The collector of the transistor Q93 is connected through a resistor R44 to the base of a PNP transistor Q90. The transistor Q90 has its base connected through a resistor R41 to the power supply Vcc and its emitter directly connected to the power supply Vcc. Also, the collector of the transistor Q90 is connected to the emitter of a PNP transistor Q91. The base of the transistor Q91 is connected to the junction between a capacitor C7 and a resistor R39 which are directly connected in series between a power supply Vcc and the ground and to one end of a secondary coil of a booster transformer T. Also, the collector of the transistor Q91 is connected through a resistor R40 to the base of an NPN transistor Q92 the emitter of which is directly connected to the ground. The collector of the transistor Q92 is connected to one end of a primary coil of the transformer T the other end of which is connected to the power supply Vcc. The other end of the secondary coil of the transformer T is connected to the anode of a rectifying diode D8. The transistors Q90 to Q92, transformer T, diode D8 form a DC-DC converter 290 for boosting the power voltage Vcc.

The cathode of the diode D8 is connected to one end of a capacitor C8, one end of a resistor R42 and the anode of a diode D9 for preventing a reverse current. The other end of the capacitor C8 is connected to the ground and the other end of the resistor R42 is connected to one end of a gas-filled discharge tube X1 for detecting the charged voltage. The other end of the tube X1 is connected through a resistor R47 to the base of an NPN transistor Q99. The transistor Q99 has its base connected through a diode D10, capacitor C11 and resistor R48 in parallel to the ground and its emitter directly connected to the ground. Additionally, the collector of the transistor Q99 is connected through resistors R50 and R49 to the power supply Vcc. The junction between resistors R50 and R49 is connected to the base of an NPN transistor Q95 the collector of which is connected to the power supply Vcc. The emitter of the transistor Q95 is connected through a resistor R51 to the ground to produce the converter reset signal.

The cathode of the diode D9 is connected to one end of a resistor R43, one end of a flashlight discharge tube X2 and one end of a main capacitor C10. The other end of the resistor R43 is connected through a switch SW1 associated with the main switch F for the flash unit and a synchronizing contact switch SW2 of the camera in series to the ground as well as through a triger capacitor C9 and a primary coil of a trigger transformer T₀ in series to the ground. A secondary coil of the trigger transformer T₀ has its one end connected to the ground and its other end connected to a trigger electrode of the discharge tube X2. The other end of the discharge tube X2 and the other end of main capacitor C10 are connected to the ground. The switches SW1 and SW2, capacitor C9 and transformer T₀ form a trigger circuit of the flashlight discharge tube X2.

In the electronic flash circuit 246, when a converter hold signal is applied thereto, the transistor Q93 turns on and the transistor Q90 also turns on to initiate the oscillation and boosting operation of the DC-DC converter 290. Accordingly, the flash circuit is supplied with a highly boosted voltage to charge capacitors C8, C9 and C10. When the main capacitor C10 is charged to a given voltage, the gas-filled discharge tube X1 is lit. By a discharging current of the discharge tube X1, the transistor Q99 turns on and in turn the transistor Q95 turns on. As a result, a converter reset signal is produced. By the converter reset signal, a flip-flop comprising NAND gates 36, 37 in the first power system circuit shown in FIG. 2 is reset through inverter 38 and the converter hold signal, normally produced through the inverter 54, NAND gate 57 and inverter 58, is interrupted. As a result, in FIG. 6, the transistor Q93 turns off and in turn the transistor Q90 turns off to interrupt the oscillation of the DC-DC converter 290. Accordingly, the charging is completed under the condition where the main capacitor C10 has been charged to a given voltage. When the discharge tube X1 ceases discharging as the capacitor C8 discharges, the transistors Q99, Q95 turn off, interrupting the converter reset signal. As such, when the main capacitor C10 is charged to a given voltage, the DC-DC converter 290 is deactivated so that the power is not wasted.

After completion of the charging of the main capacitor C10, when the shutter release button is depressed and the shutter is released, the synchronizing contact switch SW2 is closed in synchronism with the fully opening of the shutter. Thereby, the charge of the trigger capacitor C9 flows through the switch SW1 which has been closed in cooperation with the closing of the main switch F and the synchronizing contact switch SW2 into the primary coil of the trigger transformer T₀, to produce a high voltage in the secondary coil thereof. The trigger electrode receives the high voltage to excite the discharge tube X2 which emits a flashlight by the charge of the main capacitor C10. The amount of the flashlight emission of the discharge tube X2 is substantially constant as the charge of the main capacitor C10 is constant.

Figure 7:
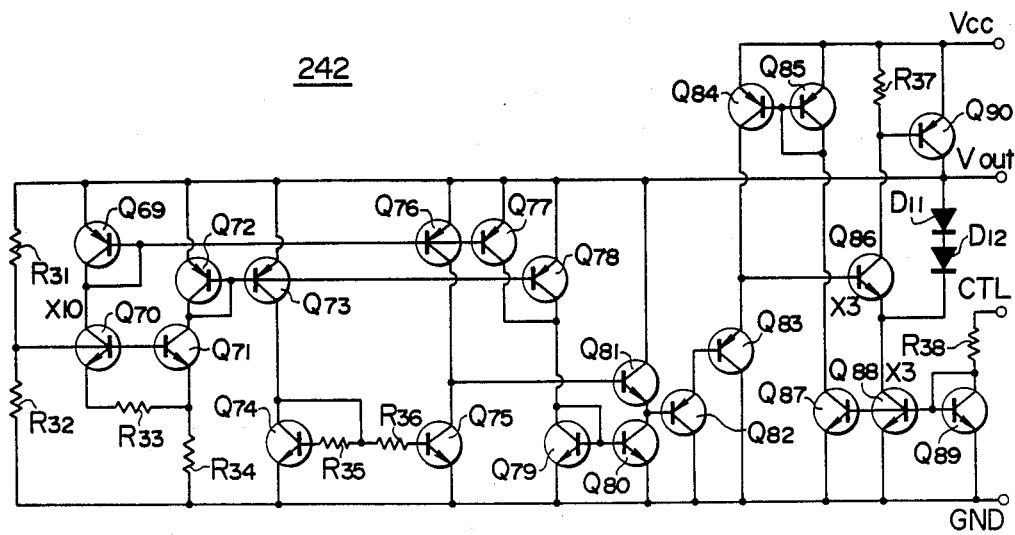
FIG. 7 is a wiring diagram of a constant voltage circuit in the camera shown in FIG. 1.

In FIG. 7, which illustrates a detailed diagram of the constant voltage circuit 242 shown in FIG. 1, the circuit 242 comprises resistors R31 to R38, transistors Q69 to Q90 and diodes D11, D12. When a control signal CTL is supplied under the condition where the power voltage Vcc is supplied, the circuit 242 produces a constant voltage which is settled by the ratio between resistors R31 and R32 at an output terminal Vout. The explanation of detailed construction and operation of the circuit 242 will be omitted as they are not related to the subject matter of the present invention.

Figure 8:
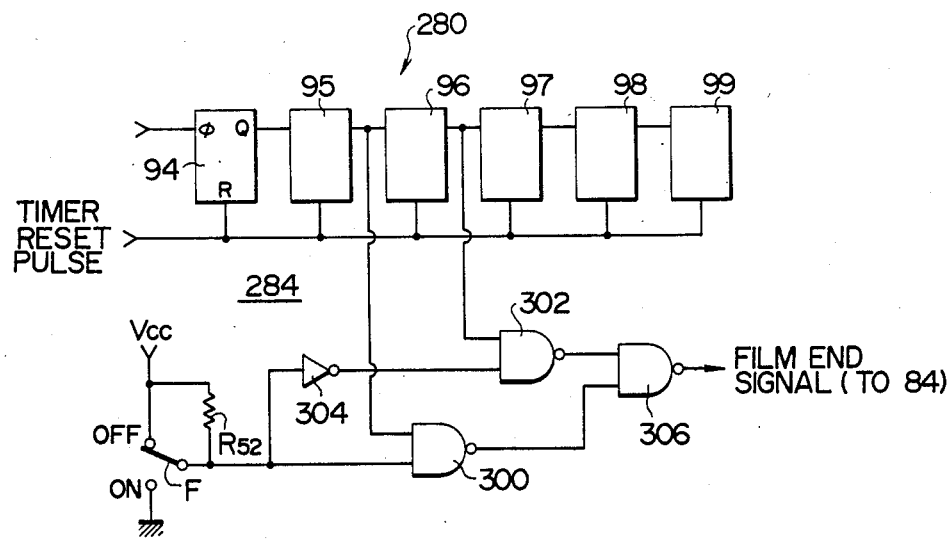
FIG. 8 is an electric circuit diagram of a film end detector shown in FIG. 3.

In FIG. 8, which illustrates a detailed diagram of the film end detector 284 shown in FIG. 3, the detector 284 comprises the main switch F for the flash unit, resistor R52, inverter 304 and NAND gates 300, 302, 306. The main switch F has an "ON" terminal connected to the ground and an "OFF" terminal connected to the power supply Vcc. A switching contact terminal of the switch F is connected through resistor R52 to the power supply Vcc and to the input terminal of the inverter 304 and one input terminal of the NAND gate 300. The output terminal of inverter 304 is connected to one input terminal of the NAND gate 302 the other input terminal of which is connected to the output terminal of the flip-flop 96. The other terminal of the NAND gate 300 is connected to the output terminal of the flip-flop 95. The output terminals of NAND gates 302 and 300 are connected to one input terminal and the other input terminal of the NAND gate 306, respectively. The output terminal of the NAND gate 306 is connected to one input terminal of the NAND gate 84 (FIG. 3).

In the film end detector 284 just described above, when the main switch F for the flash unit is off, an output of the NAND gate 302 is always at the "H" level and an output of the NAND gate 300 is in accordance with an output of the flip-flop 95. Accordingly, when the output of the flip-flop 95 turns from the "L" level to the "H" level, the output of the NAND gate 300 turns from the "H" level to the "L" level. As a result, film end detection signal at the "H" level is produced from the NAND gate 306. Conversely, when the main switch F is on, an output of the NAND gate 300 is always at the "H" level and an output of the NAND gate 302 is in accordance with an output of the flip-flop 96. When an output of the flip-flop 96 turns from the "L" level to the "H" level, an output of the NAND gate 302 turns from the "H" level to the "L" level. As a result, a film end signal at the "H" level is produced from the NAND gate 306.

Operations of the film end detector constructed as above will be explained hereinafter with reference to flow charts shown in FIGS. 9 to 11. In these flow charts, names of steps entered in portions bounded by broken lines represent manual operations and when these operations are not effected the camera is standing by ready at the named operation steps.

Figure 9:
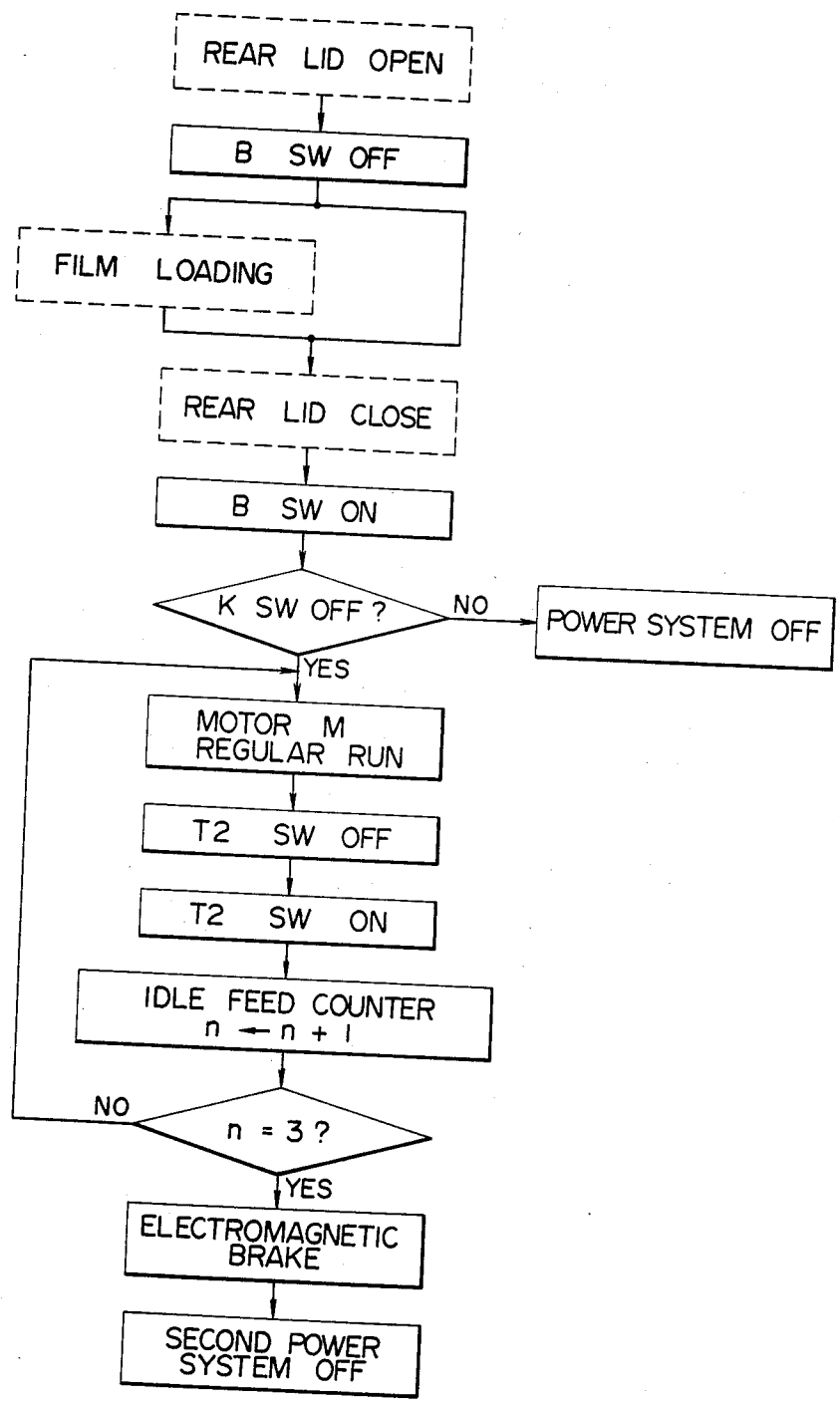
FIGS. 9 to 11 are flow charts illustrating outlines of sequential operations of the camera shown in FIGS. 1 to 8.

As shown in FIG. 9, when the rear lid of the camera is opened, the switch B turns off. Subsequently, when the rear lid is closed with or without a film loaded, the switch B turns on. When a film is loaded, the film detection switch K turns off and when a film is not loaded, the switch K turns on. When the switch K is on, since a power supply signal is not supplied from the control signal supply circuit (FIG. 4) to the first power system circuit (FIG. 2), the latter maintains its deactivated condition. Thereby, the power supply signal is not sent to the second power system circuit so that it maintains its deactivated condition. Accordingly, the camera itself remains its deactivated condition.

When the switch K is off, the power supply signal is supplied from the control signal supply circuit to the first power system circuit to activate the latter. With the switch B closed, a control signal B' is supplied from the control signal supply circuit to the first power system circuit and a power supply signal is in turn supplied from the first power system to the second power system circuit to activate it. At the same time, a timer reset pulse and a film counter reset pulse are produced and the counter comprising the timer 280 and flip-flops 63, 64 and the like are reset. Additionally, an idle feed hold signal is produced and a regular direction run signal is produced in response to the idle feed hold signal. As a result, the motor M in the motor drive circuit 238 (FIG. 5) rotates in the regular direction to initiate a film idle feed. As the film idle feed advances, the switch T2 associated with the film winding is closed, thereby causing the idle feed counter (63, 64) to count up. When the film length corresponding to three frames is idly fed, the regular direction run signal is interrupted and a brake signal is produced so that the motor M is quickly braked to interrupt the film idle feed. After that, since an idle feed reset signal is produced from the timer 280, the idle feed hold signal is interrupted and the power supply signal to the second power system circuit is also interrupted to deactivate the latter.

Figure 10:
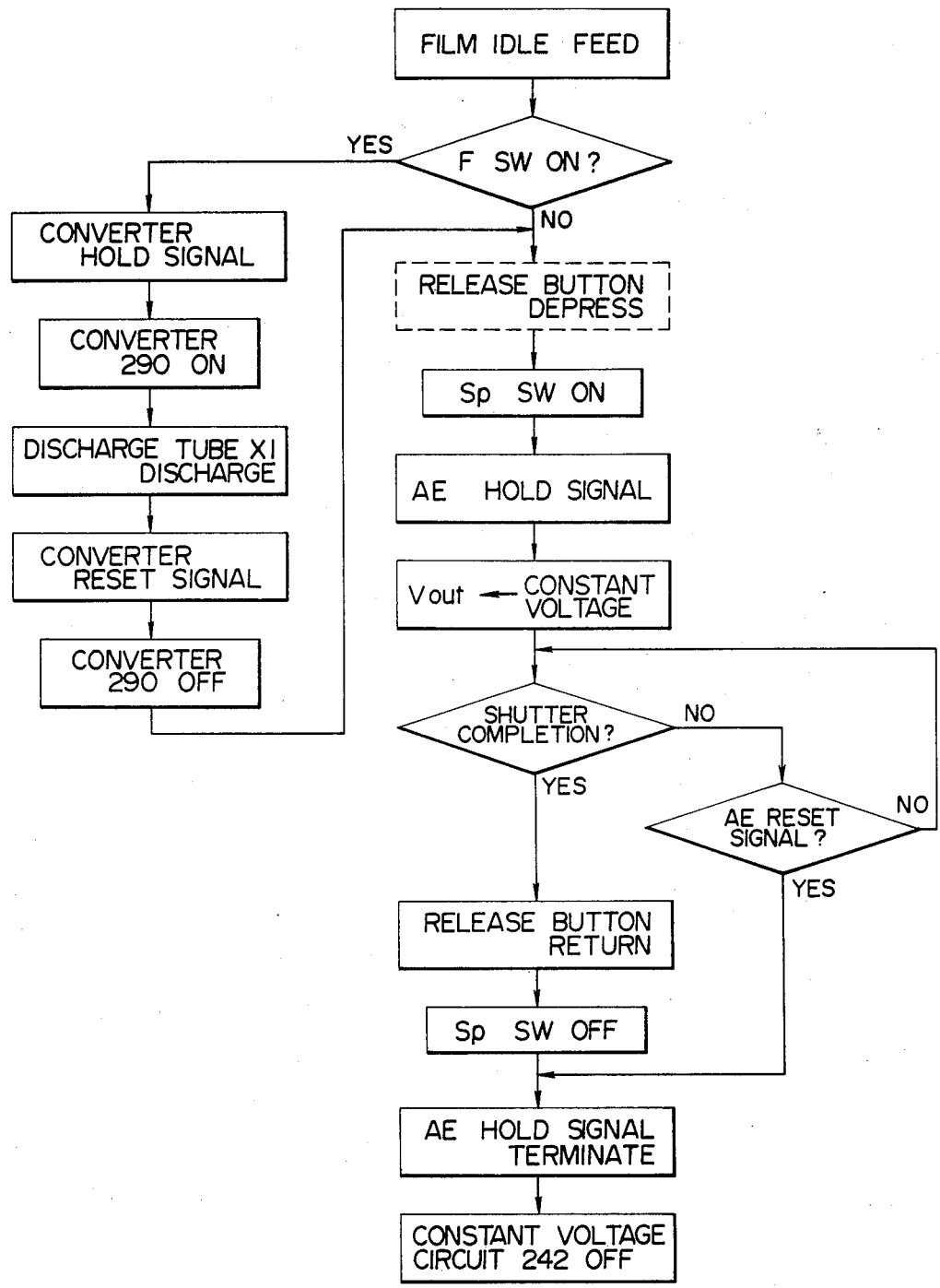

When the main switch F is closed, as shown in FIG. 10, the charging to the electronic flash unit is effected during the film idle feed operation. Specifically, since a control signal F' is produced from the control signal supply circuit, a converter hold signal is produced to apply it to the electronic flash circuit 246 shown in FIG. 6 and thereby to initiate the boosting operation of the DC-DC converter 290. As a result, the main capacitor C10 is charged. When the main capacitor C10 is charged to a given voltage, the gas-filled discharge tube X1 discharges to produce a converter reset signal. By this signal, the converter hold signal in FIG. 2 is interrupted. Accordingly, the DC-DC converter 290 stops its operation under the condition where the main capacitor C10 has been charged to a given voltage.

When the shutter release button is depressed to take a picture, the release switch Sp turns on to produce a control signal Sp'. Thereby, a power supply signal is produced from the first power system circuit to reactivate the second power system circuit. At the same time, an automatic exposure (AE) hold signal is produced and a control signal CTL is produced from the second power system circuit and thereby the constant voltage circuit 242 shown in FIG. 7 produces a constant voltage at the output terminal Vout. This constant voltage is applied to the exposure control circuit 244 (FIG. 1) to initiate the operation thereof. Additionally, with the control signal Sp', a timer reset pulse and a film counter reset pulse are produced to reset the timer 280 and the counter (63, 64).

When a given period elapses after the timer 280 has been reset, a release (Sp) reset signal is produced. Thereby, while an ouput of the NAND gate 21 turns to the "H" level, the control signal Sp' remains at the "L" level so that an output of the NAND gate 45 remains at the "H" level and the automatic exposure (AE) hold signal keeps its output condition.

When the shutter operation is completed, the shutter release button returns to its normal position and the release switch Sp is opened. Thereby, the control signal Sp' turns to the "H" level and the automatic exposure (AE) hold signal is interrupted. Also, the control signal CTL is interrupted to deactivate the constant voltage circuit 242. Thereby, the exposure control circuit 244 also is deactivated. At the same time, the power supply signal is interrupted to deactivate the second power system circuit.

In the case where the camera is put in a bag or the like and the shutter release button is undesirably maintained depressed, the automatic exposure (AE) reset signal is produced through the NAND gate 102 and the inverter 46 by the timing operation of the timer 280 after a predetermined period, for example, 90 sec. The AE reset signal is applied to the first power system circuit to interrupt the automatic exposure (AE) hold signal. As a result, the control signal CTL is interrupted and the operations of the constant voltage circuit 242 and the exposure control circuit 244 are similarly interrupted. Also, the second power system circuit is deactivated.

Thus, even in case of an erroneous operation, a power dissipation may be prevented.

Figure 11:
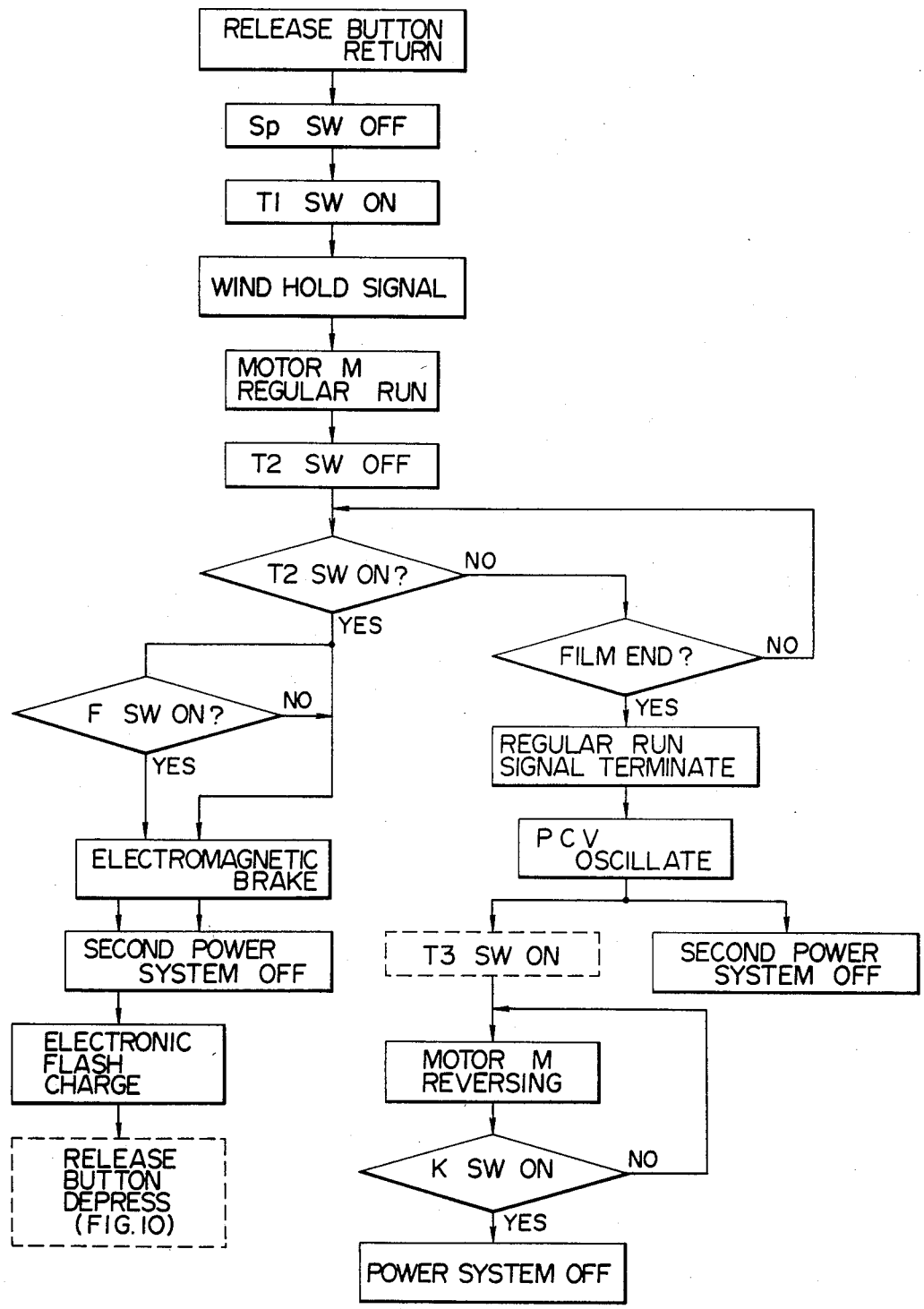

When the shutter release button returns to its normal position upon completion of a photographing, as shown in FIG. 11, the release switch Sp turns off and subsequently the wind initiation switch T1 turns on to produce a control signal T1'. Thereby, the second power system circuit is again activated by an output of the power supply signal and the timer 280 and the counter (63, 64) are reset by outputs of a timer reset pulse and a film counter reset pulse, respectively. A wind hold signal is also produced and by this signal a regular direction run signal is produced to supply it to the motor drive circuit 238. As a result, the motor M rotates in the regular direction to wind a film.

When a film length corresponding to one frame is wound and the switch T2 turns on, the regular direction run signal is interrupted and a brake signal is produced to stop the motor M momentarily. When a given time period elapses after the timer 280 has been reset, outputs of the flip-flops 72, 73 forming the counter turn to the "H" level and a wind reset signal is produced. Thereby, the wind hold signal is interrupted and the power supply signal is also interrupted to deactivate the second power system circuit.

When a film is brought into its end condition where it cannot be further drawn out from the cartridge while the film is winding, the motor M is idling as the switch T2 does not turn on. When a predetermined period elapses after initiation of the film winding, a film end signal is produced from the film end detector 284 shown in FIG. 8 in response to an output of either the flip-flop 95 or 96 of the timer 280. Specifically, as aforesaid, when the switch F is off, a film end signal is produced in response to an output of the flip-flop 95 and when the switch is on, a film end signal is produced in response to an output of the flip-flop 96.

Since timing for an output of the flip-flop 96 is later than the one for an output of the flip-flop 95, the timing for an output of the film end signal when the switch is on is later than the one when the switch F is off. When the switch F is on, the amount of current supply of the dry cell 210 to the motor M decreases by the operation of the DC-DC converter 290 and the rotating torque of the motor M is lowered to make the time period required to wind the film long. However, as the timing for an output of a film end signal is delayed, an error in the detection of film end may be prevented.

When the film end signal is produced, an output of the NAND gate 84 turns to the "L" level and the regular direction run signal is interrupted to stop the motor M. At the same time, a sounding signal $PCV_{ON}$ is produced from the inverter 85 and a control signal CTL is produced from the NAND gate 82. Thereby, a constant voltage is applied through the constant voltage circuit 242 to the exposure control circuit 244 and the sounding element PCV (not shown) which is built in the exposure control circuit 244 produces a sound to let a photographer know of a film end condition. After that, a wind hold reset signal is produced from the inverter 101 and the power supply signal is interrupted to deactivate the second power system circuit. As a result, the control signal CTL is interrupted to deactivate the constant voltage circuit 242 and the sounding element PCV stops sounding.

When the photographer knows the film end by sounding of the sounding element PCV and indicates the film rewinding by closing the rewind switch T3, a reversing signal is produced in response to the film rewind signal and is applied to the motor drive circuit 238. Accordingly, the motor M rotates in the reverse direction to initiate the film rewinding. When the film is completely rewound in the cartridge and thus the camera is brought into the condition equivalent to an unloaded condition of a film, the film detection switch K turns on and the power supply signal to the first power system circuit is interrupted to deactivate it. Accordingly, the camera assumes the condition where most of circuits are deactivated.

In a camera having an electric film transport motor and a built-in electronic flash unit, the time period for winding a film while charging a main capacitor for the flash unit may be prolonged. However, with the film end detector of the above-mentioned embodiment, since the time period for detecting the film end while charging the main capacitor is longer than that while not changing, there is little possibility of causing an error in the detection of the film end.

Figure 12:
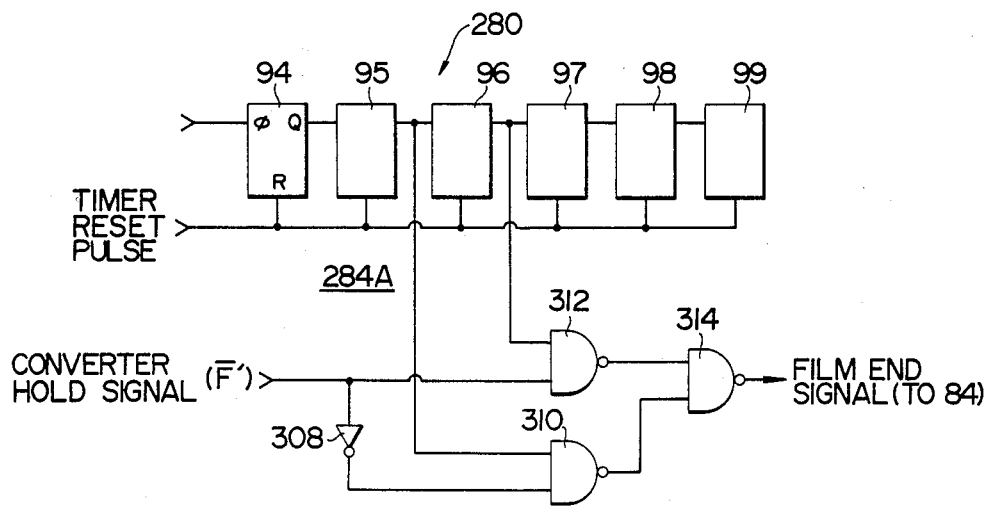
FIGS. 12 to 16 are electric circuit diagrams of film end detectors according to other embodiments of the invention.

In FIG. 12, which illustrates a film end detector 284A of another embodiment according to the present invention, while the film end detector 284 shown in FIG. 8 switches the time period for detecting the film end in accordance with the opening and closing of the switch F, the film end detector 284A switches the same in response to a converter hold signal. The converter hold signal is applied through an inverter 308 to one input terminal of a NAND gate 310 and is directly applied to one input terminal of a NAND gate 312. The other input terminal of the NAND gate 310 is connected to the output terminal of flip-flop 95 and the other input terminal of the NAND gate 312 is connected to the output terminal of flip-flop 96. The output terminal of the NAND gate 312 is connected to one input terminal of a NAND gate 314 and the output terminal of the NAND gate 310 is connected to the other input terminal of the NAND gate 314. The output terminal of the NAND gate 314 is connected to one input terminal of the NAND gate 84 to produce a film end signal.

According to the film end detector 284A as aforesaid, when a converter hold signal is not applied, the output of NAND gate 310 varies in response to an output of the flip-flop 95 and a film end signal is produced from the NAND gate 314. When the converter hold signal is applied, the output of the NAND gate 312 varies in response to an output of the flip-flop 96 and a film end signal is produced from the NAND gate 314. With the film end detector 284A, since the time period for detecting the film end while the converter hold signal is produced, namely the main capacitor C10 is charged, is longer than the time required when the capacitor is not charged, it is to be noted that there is little possibility of causing an error in the detection of the film end.

In the film end detector 284A, it is possible to obtain substantially the same actions and effects even by employing an inverted signal to a control signal F' which is produced when the switch F turns on, in place of the converter hold signal.

Figure 13:
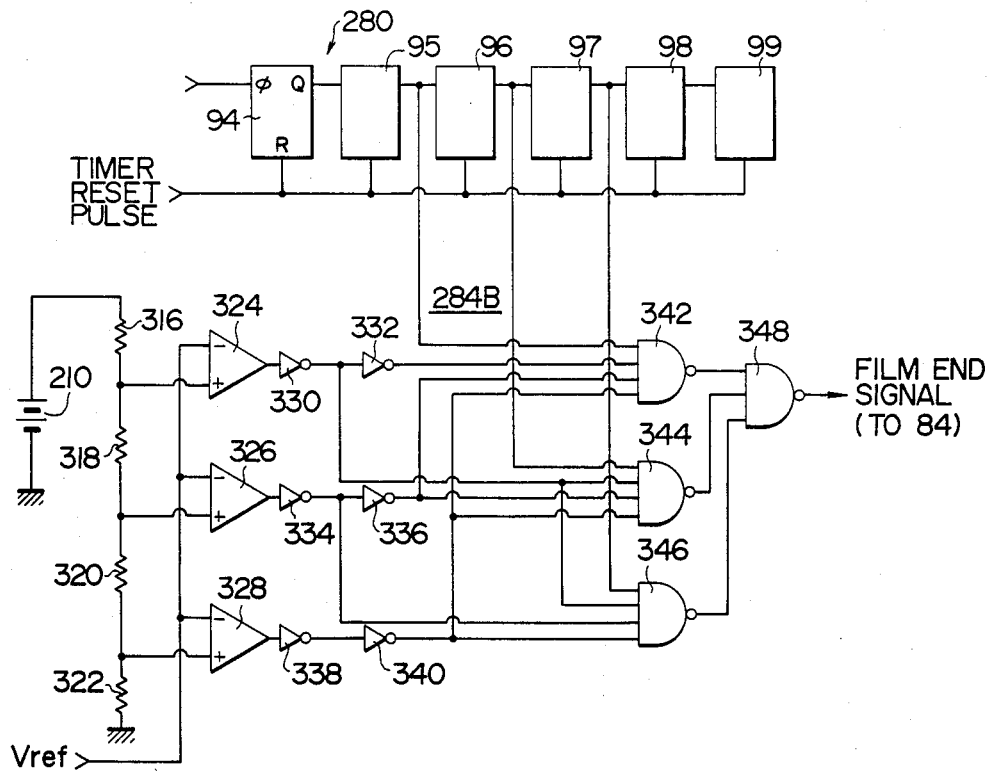

In FIG. 13, which illustrates a film end detector 284B of a further embodiment according to the invention, the film end detector 284B detects a supply power voltage drop due to a consumption of a dry cell, a low temperature, a simultaneous charging of an electronic flash unit or the like and changes the time period for detecting the film end in accordance with the detection of the voltage drop. The film end detector 284B comprises resistors 316, 318, 320, 322, comparators 324, 326, 328, inverters 330, 332, 334, 336, 338, 340 and NAND gates 342, 344, 346, 348. The resistors 316, 318, 320, 322 are connected in series between the positive pole of the dry cell 210 and the ground. The junctions between resistors 316, 318; 318, 320; and 320, 332 are connected to the non-inverting input terminals of the comparators 324, 326, 328, respectively. A reference voltage Vref is applied to the inverting input terminals of the comparators 324, 326, 328. The output terminal of the comparator 324 is connected through inverters 330, 332 in series to a second input terminal of the NAND gate 342 and the output terminal of the inverter 330 is connected to second input terminals of the NAND gates 344, 346. The output terminal of the comparator 326 is connected through inverters 334, 336 in series to third input terminals of NAND gates 342, 344 and the output terminal of the inverter 334 is connected to a third input terminal of the NAND gate 346. The output terminal of the comparator 328 is connected through inverters 338, 340 to fourth input terminals of the NAND gates 342, 344, 346. First input terminals of NAND gates 342, 344, 346 are connected to the output terminals of flip-flops 95, 96, 97, respectively. The output terminals of NAND gates 342, 344, are connected to first, second and third input terminals of NAND gate 348, respectively and the output terminal of the NAND gate 348 is connected to one input terminal of the NAND gate 84 to produce a film end signal.

In the film end detector 284B, when the electromotive force of the dry cell 310 is sufficiently high and a voltage at the junction between resistors 320, 322 is higher than the reference voltage Vref, all outputs of the comparators 324, 326, 328 turn to the "H" level. As a result, outputs of the NAND gates 344, 346 keep the "H" level and an output of the NAND gate 342 assumes a level in compliance with an output of the flip-flop 95. Accordingly, when the output of flip-flop 95 turns to the "H" level, an output of the NAND gate 342 is reversed from the "H" level to the "L" level. Thereby, a film end signal at the "H" level is produced from the output terminal of the NAND gate 348. In addition, when the supply power voltage decreases due to consumption of the dry cell 210, a low temperature condition, simultaneous charging of the electronic flash unit or the like, outputs of the comparators 324, 326 assume the "L" level in accordance with the degree of the voltage drop. Specifically, when the power voltage is slightly decreased, a voltage at the junction between resistors 320, 322 decreases below the reference voltages Vref, resulting in the output of the comparator 328 assuming the "L" level and outputs of the comparators 324, 326 assuming the "H" level. Accordingly, outputs of the NAND gates 342, 346 keep the "H" level and an output of the NAND gate 344 assumes a level in compliance with an output of the flip-flop 96. When an output of the flip-flop 96 turns to the "H" level, an output of the NAND gate 344 is reversed to the "L" level and a film end signal at the "H" level is produced from the output terminal of the NAND gate 348. When the supply power voltage further decreases, a voltage at the junction between resistors 318, 320 also drops below the reference voltage Vref so that outputs of the comparators 328, 326 assume the "L" level and an output of the comparator 324 assumes the "H" level. As a result, outputs of the NAND gates 342, 344 assume the "H" level and an output of the NAND gate 346 assumes a level in compliance with an output of the flip-flop 97. Accordingly, when an output of the flip-flop 97 assumes the "H" level, an output of the NAND gate 346 is reversed to the "L" level and a film end signal of the "H" level is produced from the output terminal of the NAND gate 348.

The timing for an output of the flip-flop 96 is later than the one for an output of the flip-flop 95 and the timing for an output of the flip-flop 97 is later than the one for an output of the flip-flop 96. Accordingly, the lower the supply power voltage, the later the timing for an output of the film end signal, thus an error in the detection of the film end is prevented.

Figure 14:
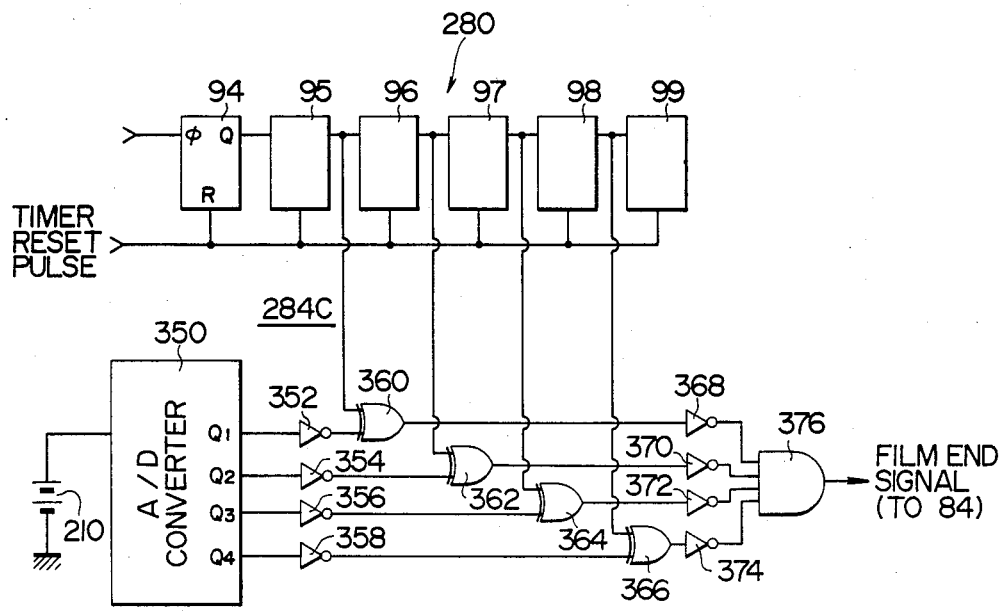

In FIG. 14, which illustrates a film end detector 284C of a still further embodiment according to the invention, the film end detector 284C converts the supply power voltage to a four-bit digital signal employing an A/D converter 350 and changes the timing for detecting the film end in accordance with the digital signal. The input terminal of the A/D converter 350 is connected to the positive pole of a dry cell 210 and output terminals $Q_1$ (LSB), $Q_2$, $Q_3$, $Q_4$ (MSB) of the converter 350 are connected through inverters 352, 354, 356, 358 to one input terminals of exclusive OR gates (hereinafter expressed as an EX-OR gate) 360, 362, 364, 366, respectively. The other input terminals of EX-OR gates 360, 362, 364, 366 are connected to the output terminals of the flip-flops 95, 96, 97, 98, respectively and the output terminals thereof are connected through inverters 368, 370, 372, 374 to a first, second, third, fourth input terminal, respectively, of an AND gate 376. The output terminal of the AND gate 376 is connected to one input terminal of the NAND gate 84 to produce a film end signal.

According to the film end detector 284C as aforesaid, an A/D conversion of the supply power voltage is performed to produce a four-bit digital signal from the output terminals $Q_1$ to $Q_4$ of the converter 350. The highest voltage is digitally expressed by "1110" and the lowest voltage is expressed by "0000". In the film end detector 284C, when all outputs of EX-OR gates 360, 362, 364, 366 turn to the "L" level, namely when both inputs of all these gates are at the same level, a film end signal is produced. The higher the supply power voltage is, the larger value of a binary data the converter 350 produces. Since one of the EX-OR gates to which an output of a higher position bit among outputs of the converter 350 is applied is connected to a lower position flip-flop of the timer 280, the higher an output of the converter 350 is, the sooner both inputs of each of EX-OR gates 360, 362, 364, 366 assume the same level. In other words, the higher the supply power voltage is, the sooner a film end signal is produced.

As such, it is possible in the film end detector 284C to allow the timing for detecting the film end to accurately follow a change in the supply power voltage so that an accuracy to detect the film end may be improved and an error in the detection may be effectively prevented.

While, in the film end detectors 284B and 284C shown in FIGS. 13 and 14, the time period for detecting the film end is changed by detecting the supply power voltage, it may be changed by detecting a drive current of the motor M. Alternatively, the time period for detecting the film end may be changed by providing a temperature sensor and positively detecting a temperature change in response to an output from the sensor.

Figure 15:
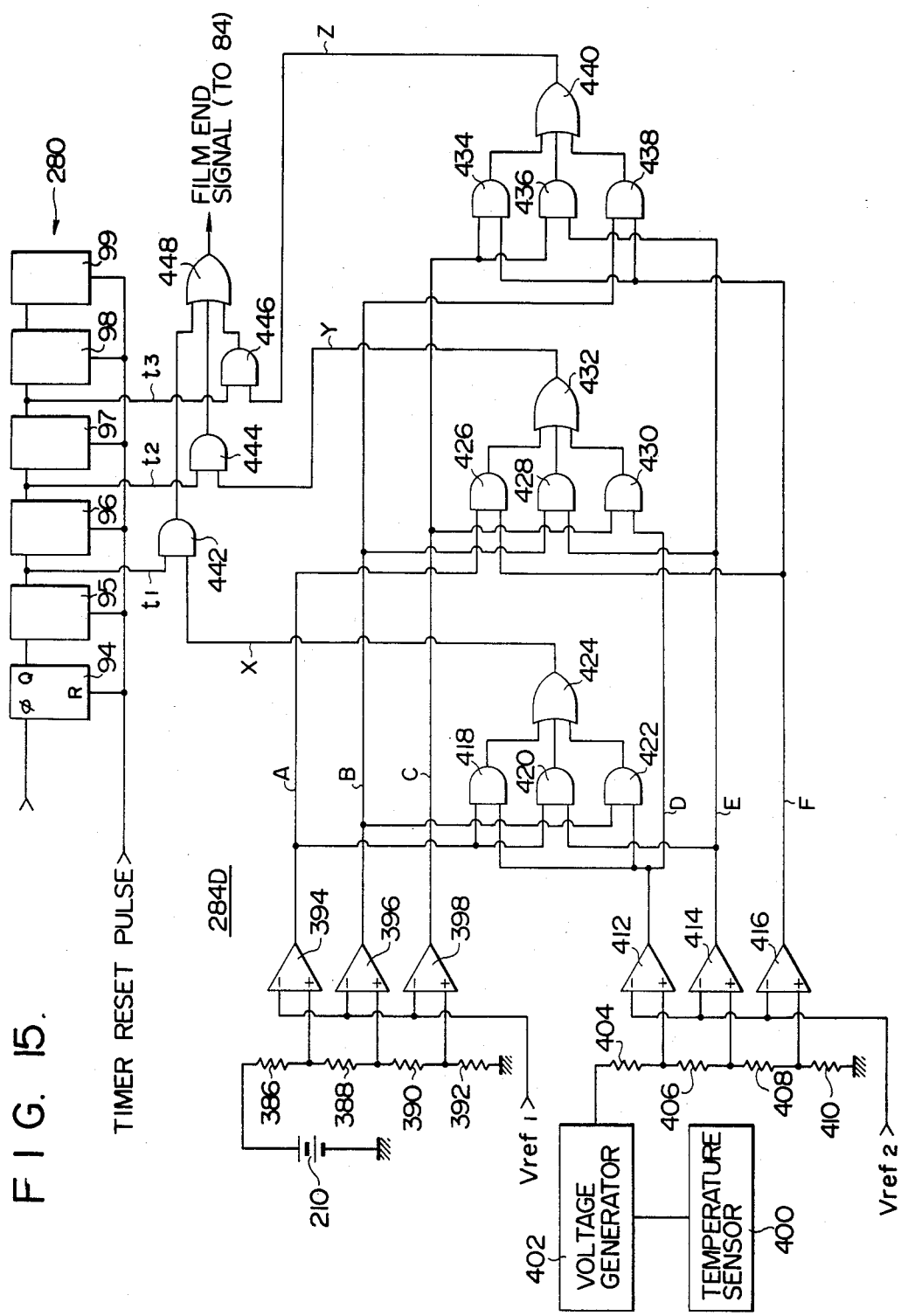

In FIG. 15, which illustrates a film end detector 284D of still another embodiment according to the invention, the film end detector 284D changes the time period for detecting the film end in accordance with a change in a supply power voltage and a change in an output of a temperature sensor. The positive pole of a dry cell 210 is connected through resistors 386, 388, 390, 392 in series to the ground. The junctions between resistors 388 and 390, resistors 388 and 390 and resistors 390 and 392 are connected to non-inverting input terminals of comparators 394, 396 and 398, respectively. A reference voltage Vref1 is applied to inverting input terminals of comparators 394, 396 and 398. An output A of the comparator 394 is applied to one input terminal of each of the AND gates 418, 420 and 426. An output B of the comparator 396 is applied to one input terminal of each of the AND gates 422, 428 and 438. An output C of the comparator 398 is applied to one input terminal of each of the AND gates 430, 434 and 436.

A temperature sensor 400 is connected to a voltage generator 402 the output terminal of which is connected through resistors 404, 406, 408, 410 in series to the ground. The junctions between resistors 404 and 406, 406 and 408 and 408 and 410 are connected to non-inverting input terminals of comparators 412, 414 and 416, respectively. A reference voltage Vref2 is applied to inverting input terminals 412, 414 and 416. An output D of the comparator 412 is applied to the other input terminal of each of the AND gates 418, 422 and 430. An output E of the comparator 414 is applied to the other input terminal of each of the AND gates 420, 428 and 436. An output F of the comparator 416 is applied to the other input terminals of each of the AND gates 426, 434 and 438.

Output terminals of AND gates 418, 420 and 422 are connected to a first, second and third input terminals of OR gate 424, respectively. An output X of the OR gate 424 is applied to the other input terminal of the AND gate 442. AND gates 426, 428 and 430 are connected to a first, second and third input terminal respectively OR gate 432. An output Y of the OR gate 432 is applied to the other input terminal of AND gate 444. AND gates 434, 436 and 438 are connected to a first, second and third input terminal, respectively, of OR gate 440. An output Z of the OR gate 440 is applied to the other input terminal of AND gate 446. Outputs $t_1$, $t_2$ and $t_3$ of the flip-flops 95, 96 and 97 are applied to one input terminal of each of the AND gates 442, 444 and 446, respectively. The output terminal of each of the And gates 442, 444 and 446 are connected to a first, second and third input terminal, respectively, of OR gate 448. The output terminal of the OR gate 448 is connected to one input terminal of the NAND gate 84 to produce a film end signal.

In the film end detector 284D thus constructed, outputs X, Y and Z of the OR gates 424, 432 and 440 are expressed employing outputs A, B, C, D, E and F of comparators 394, 396, 398, 412, 414 and 416 as follows:

$X = AD + AE + BD$ $Y = AF + BE + CD$ $Z = CF + CE + BF$

Accordingly, assuming that the presence of a bar line over each output letter of A, B, C, D, E and F and X, Y and Z represents the "L" level and the absence of a bar line represents the "H" level, outputs X, Y and Z assume values shown in Table 1 below in accordance with outputs A, B, C, D, E and F.

TABLE 1

|  | ABC | $\overline{A}BC$ | $\overline{AB}C$ |
|---|---|---|---|
| DEF | XYZ | XYZ | $\overline{X}YZ$ |
| $\overline{D}EF$ | XYZ | $\overline{X}YZ$ | $\overline{XY}Z$ |
| $\overline{DE}F$ | XYZ | $\overline{XY}Z$ | $\overline{XYZ}$ |

Accordingly, how a film end signal is produced in accordance with any one of outputs $t_1$, $t_2$ and $t_3$ of the flip-flops 95, 96 and 97 is as shown in Table 2.

TABLE 2

|  | ABC | $\overline{A}BC$ | $\overline{AB}C$ |
|---|---|---|---|
| DEF | $t_1$ | $t_1$ | $t_2$ |
| $\overline{D}EF$ | $t_1$ | $t_2$ | $t_3$ |
| $\overline{DE}F$ | $t_2$ | $t_3$ | $t_3$ |

As will be noted from Table 2, according to the film end detector 284D, the timing for detecting the film end may be adjusted in accordance with information combining the supply power voltage with an ambient temperature.

Figure 16:
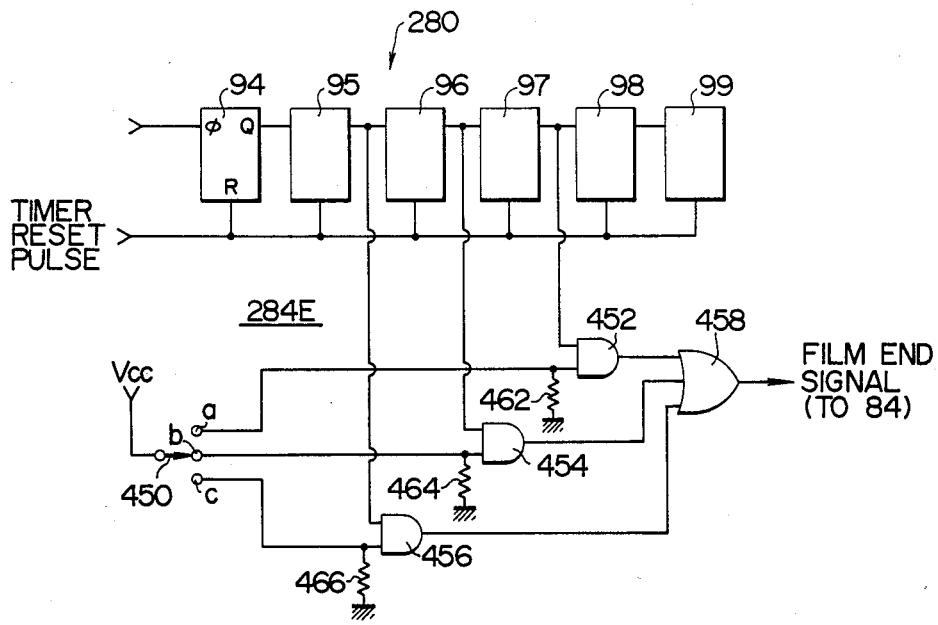

While all the film end detectors in the foregoing automatically adjust the time period for detecting the film end, the time period may alternately be changed by a manual operation as in a film end detector 284E shown in FIG. 16. In the film end detector 284E, a manual switch 450 which includes three fixed contacts a, b, c is provided and its movable contact terminal is connected to a power supply Vcc. The fixed contacts a, b and c are connected through resistors 462, 464 and 466, respectively, to the ground and to one input terminal of each of the AND gates 452, 454 and 456, respectively. The other input terminal of each of the AND gates 452, 454 and 456 are connected to the output terminals of flip-flops 95, 96 and 97, respectively. The output terminals of AND gates 452, 454 and 456 are connected to a first, second and third input terminal of OR gate 458, respectively. The output terminal of OR gate 458 is connected to one input terminal of the NAND gate 84 to produce a film end signal.

According to the film end detector 284E thus constructed, any one of the other input terminals of AND gates 452, 454, 456 turns to the "H" level by manually switching the switch 450 to produce a film end signal in response to an output of the corresponding flip-flop. Thus, the time period for detecting the film end can be changed by the manual operation.

What is claimed is:

1. A film end detector for use in a camera, comprising:
   timer means for initiating a timing operation in synchronism with initiation of a power supply to a film winding motor;
   detector means for detecting a winding of the film length corresponding to one frame;
   means for resetting said timer means in response to an output of said detector means when the film length corresponding to one frame has been wound;
   means for producing a film end signal when said timer means is not reset by said resetting means within a given detection period after the initiation of said time operation by said timer means;
   detection period changing means including a film end signal generator circuit which is connected to a main switch for the electronic flash unit and said timer means, and automatically prolongs the detection period in response to an "ON" signal to the main switch.

2. A film end detector for use in a camera, comprising:
   timer means for initiating a timing operation in synchronism with initiation of a power supply to a film winding motor;
   detector means for detecting a winding of the film length corresponding to one frame;
   means for resetting said timer means in response to an output of said detector means when the film length corresponding to one frame has been wound;
   means for producing a film end signal when said timer means is not reset by said resetting means within a given detection period after the initiation of said time operation by said timer means;
   detection period changing means including a film end signal generator circuit which is connected to a DC-DC converter for the electronic flash unit and said timer means, to automatically prolong the detection period in response to a hold signal of said DC-DC converter.

3. A film end detector for use in a camera, comprising:
   timer means for initiating a timing operation in synchronism with initiation of a power supply to a film winding motor;
   detector means for detecting a winding of the film length corresponding to one frame;
   means for resetting said timer means in response to an output of said detector means when the film length corresponding to one frame has been wound;
   means for producing a film end signal when said timer means is not reset by said resetting means within a given detection period after the initiation of said timing operation by said timer means; and
   means for changing said detection period,
   said detection period changing means detecting the power voltage applied to said film winding motor to automatically begin prolonging the detection period when the measured power voltage is below a predetermined value;
   said detection period changing means comprising voltage divider means for dividing the power voltage, comparator means for comparing the voltage divided by said divider means with a reference voltage, and a logic circuit which is connected to said comparator means and said timer means.

4. A film end detector for use in a camera, comprising:
   timer means for initiating a timing operation in synchronism with initiation of a power supply to a film winding motor;
   detector means for detecting winding of the film length corresponding to one frame;
   means for resetting said timer means in response to an output of said detector means when the film length corresponding to one frame has been wound;
   means for producing a film end signal when said timer means is not reset by said resetting means within a given detection period after the initiation of said timing operation by said timer means; and
   means for changing said detection period,
   said detection period changing means detecting the power voltage applied to said film winding motor to automatically begin prolonging the detection period when the measured power voltage is below a predetermined value;
   said detection period changing means comprising an A/D converter for converting a power voltage into a digital signal and a logic circuit which is connected to said A/D converter and said timer means.

5. A film end detector for use in a camera, comprising:
   timer means for initiating a timing operation in synchronism with initiation of a power supply to a film winding motor;
   detector means for detecting a winding of the film length corresponding to one frame;
   means for resetting said timer means in response to an output of said detector means when the film length corresponding to one frame has been wound;
   means for producing a film end signal when said timer means is not reset by said resetting means within a given detection period after the initiation of said timing operation by said timer means; and
   means for changing said detection period,
   said detection period changing means detecting a temperature of the power circuit and automatically changing the detection period when the detected temperature lies in a predetermined range.

6. A film end detector according to claim 5, in which said detection period changing means comprises a temperature sensor, a voltage generator for converting an output of said temperature sensor into a voltage signal, voltage divider means for dividing an output voltage of said voltage generator, comparator means for comparing a voltage divided by said voltage divider means with a reference voltage and a logic circuit which is connected to said comparator means and said timer means.

7. A film end detector for use in a camera, comprising:
   timer means for initiating a timing operation in synchronism with initiation of a power supply to a film winding motor;
   detector means for detecting a winding of the film length corresponding to one frame;
   means for resetting said timer means in response to an output of said detector means when the film length corresponding to one frame has been wound;
   means for producing a film end signal when said timer means is not reset by said resetting means within a given detection period after the initiation of said timing operation by said timer means; and
   means for changing said detection period,
   said detection period changing means automatically changing the detection period in accordance with a power voltage for said film winding motor and a temperature.

8. A film end detector according to claim 7, in which said detection period changing means comprises power voltage divider means for dividing said power voltage, a first comparator means for comparing a voltage divided by said power voltage divider means with a first reference voltage, a temperature sensor, a voltage generator for converting an output of said temperature sensor into a voltage signal, voltage divider means for dividing an output voltage of said voltage generator, a second comparator means for comparing a voltage divided by said temperature voltage divider means with a second reference voltage and a logic circuit which is connected to said first and second comparator means and said timer means.

9. A film end detector for use in a camera, comprising:
- timer means for initiating a timing operation in synchronism with initiation of a power supply to a film winding motor;
- detector means for detecting a winding of the film length corresponding to one frame;
- means for resetting said timer means in response to an output of said detector means when the film length corresponding to one frame has been wound;
- means for producing a film end signal when said timer means is not reset by said resetting means within a given detection period after the initiation of said timing operation by said timer means; and
- means for changing said detection period,
- said detection period changing means including a switch and a logic circuit which is connected to the switch and said timer means for changing the detection period by manually operating said switch.

10. Detection means for controlling the operation of a camera having a lid enclosing a film chamber of the camera comprising:
- a power source for selectively operating the motor drive, electronic flash and exposure control circuits of the camera;
- a film idle control circuit operating during a predetermined time interval responsive to opening of the camera lid for energizing the motor drive for advancing the film drive;
- means responsive to depression of a camera shutter release button for providing the exposure control circuit with constant voltage;
- means responsive to release of the shutter release button for operating the motor drive to advance the film one frame;
- film winding control means responsive to coupling of the flash to the power source during film winding for increasing the time interval for advancing the film.

11. The detector means of claim 10, further comprising means for isolating the power source from all of the aforementioned power utilization sources when there is no film in the film chamber.

12. The detector means of claim 10, further comprising timing means;
- frame detecting means responsive to the advance of a film frame for generating a detection signal;
- means responsive to operation of frame detecting means for energizing the timing means;
- means responsive to a first condition of said timing means and a predetermined number of said detection signals for halting advance of said film by said film idle control means.

13. The detector of claim 12, wherein said film winding control means further comprises means responsive to a second condition of said timing means when the power source is in a first state and responsive to a third condition of the timing means when the power source is in a second state.

* * * * *

UNITED STATES PATENT AND TRADEMARK OFFICE
CERTIFICATE OF CORRECTION

PATENT NO. : 4,572,637  Page 1 of 2
DATED : February 25, 1986
INVENTOR(S) : AKIRA INOUE It is certified that error appears in the above-identified patent and that said Letters Patent is hereby corrected as shown below:

Column 3, line 4, delete "with";

Column 7, line 61, change "open" to --opens--;

Column 10, line 51, before "just" insert --in the manner--;

Column 11, line 15, change "turns" to --changes--;

Column 11, line 41, change "produce the" to --produce a--;

Column 19, line 38, before "timing" insert --the--;

Column 21, line 30, change "310" to --210--;

Column 22, line 55, after "the" insert --film end--;

Column 23, line 4, change "388 and 390" (first occurrence) to --386 smf 388--;

Column 23, line 35, before "AND" insert --The output terminals of each of the --;

Column 23, line 36, change "respectively" to --, respectively of--;

UNITED STATES PATENT AND TRADEMARK OFFICE
CERTIFICATE OF CORRECTION

PATENT NO. : 4,572,637

DATED : February 25, 1986

INVENTOR(S) : AKIRA INOUE

It is certified that error appears in the above-identified patent and that said Letters Patent is hereby corrected as shown below:

Column 23, line 39, before "AND" insert --The output terminal of each of the--; and Column 23, line 46, change "And" to --AND--.

Signed and Sealed this

Twenty-sixth Day of August 1986

[SEAL]

Attest:

DONALD J. QUIGG

Attesting Officer

Commissioner of Patents and Trademarks